(12) United States Patent
Mrozek et al.

(10) Patent No.: US 9,329,365 B2
(45) Date of Patent: May 3, 2016

(54) WIDE FIELD OF VIEW MONOCENTRIC LENS SYSTEM FOR INFRARED AERIAL RECONNAISSANCE CAMERA SYSTEMS

(75) Inventors: Fred Mrozek, Freeport, IL (US); Ming Yu, Barrington, IL (US); Daniel J. Henry, Cary, IL (US)

(73) Assignee: GOODRICH CORPORATION, Charlotte, NC (US)

( * ) Notice: Subject to any disclaimer, the term of this patent is extended or adjusted under 35 U.S.C. 154(b) by 1258 days.

(21) Appl. No.: 13/200,463

(22) Filed: Sep. 23, 2011

(65) Prior Publication Data

US 2013/0076900 A1 Mar. 28, 2013

(51) Int. Cl.
*G02B 13/14* (2006.01)
*G02B 13/06* (2006.01)

(52) U.S. Cl.
CPC ............... *G02B 13/06* (2013.01); *G02B 13/14* (2013.01)

(58) Field of Classification Search
None
See application file for complete search history.

(56) References Cited

U.S. PATENT DOCUMENTS

| | | | | |
|---|---|---|---|---|
| 3,723,904 | A | 3/1973 | Bernier | 40/150 |
| 4,494,819 | A * | 1/1985 | Lidwell | 359/356 |
| 5,311,611 | A | 5/1994 | Migliaccio | 385/120 |
| 5,668,593 | A | 9/1997 | Lareau et al. | 348/146 |
| 6,320,703 | B1 | 11/2001 | Chen et al. | 359/753 |
| 6,399,190 | B1 | 6/2002 | Myers et al. | 428/335 |
| 6,416,181 | B1 | 7/2002 | Kessler et al. | 353/7 |
| 6,570,715 | B2 | 5/2003 | Chen et al. | 359/664 |
| 6,849,843 | B2 | 2/2005 | Ansorge et al. | 250/208 |
| 6,894,843 | B2 | 5/2005 | Chang | 359/662 |
| 6,985,184 | B2 | 1/2006 | Sato | 348/340 |
| 7,002,154 | B2 | 2/2006 | Wellman et al. | 250/352 |
| 7,672,045 | B2 | 3/2010 | Baker | 359/356 |
| 7,742,090 | B2 | 6/2010 | Street et al. | 348/294 |
| 7,786,421 | B2 | 8/2010 | Nikzad et al. | 250/208.1 |
| 2010/0264502 | A1 | 10/2010 | Christophersen et al. | 257/429 |
| 2011/0211106 | A1 | 9/2011 | Marks et al. | 348/340 |

FOREIGN PATENT DOCUMENTS

| | | | | |
|---|---|---|---|---|
| WO | | 0125831 A2 | 4/2001 | |
| WO | | WO 01/25831 | 4/2001 | ............ G02B 13/06 |
| WO | | WO0125831 A2 | 4/2001 | |

OTHER PUBLICATIONS

PCT International Search Report and Written Opinion of the International Searching Authority for International Application No. PCT/US2012/000113, Sep. 14, 2012, 14 pages.

(Continued)

*Primary Examiner* — Derek S Chapel
(74) *Attorney, Agent, or Firm* — Cantor Colburn LLP

(57) ABSTRACT

A wide field of view monocentric lens system for an infrared aerial reconnaissance camera includes front and rear lens shell elements and a core lens element, with the number of front and rear shell lens elements depending on the IR band of interest (LWIR, MWIR or SWIR). Infrared radiation entering the monocentric lens passes sequentially through the front shell lens element(s), the core lens element, and the rear shell lens element(s) and is focused onto a curved focal surface. The front shell lens element(s) and the rear shell lens element(s) are made of material having a relatively higher refractive index or a relatively higher optical dispersion, or both, in the band of interest, as compared to the core lens element.

10 Claims, 18 Drawing Sheets

(56) References Cited

OTHER PUBLICATIONS

Iwert et al., The Challenge of Highly Curved Monolithic Imaging Detectors, conference poster paper, Detectors for Astronomy Workshop, Oct. 12-16, 2009, published in Proceedings of the SPIE, vol. 7742, pp. 774227-774227-9 (2010).

Hayden, Joseph, *Ecologically Friendly Optical Glasses*, Optics and Photonics News, Aug. 2004, and Schott Inc. North America catalogue.

Rim, et al., *The optical advantages of cured focal plane arrays*, Optics Express, vol. 16, No. 7, pp. 4965-4971, Mar. 31, 2008.

Lewotsky, Kristin, *Imaging Advances Boost Defense*, Advanced Imaging Magazine online edition, Mar. 2010, Updated Jan. 12, 2011, available at: http://www.advancedimagingpro.com/print/Advanced-Imaging-Magazine/Imaging-Advances-Boost-Defense/1$6598.

*Flexi Detectors Sharpen Pics*, Photonics Magazine, News and Features, online edition Jan. 2009, http://www.photonics.com/Article.aspx?AID=35991.

D. Shafer, *Galaxy Wars Optics*, Optics News 14, 9-13 (1988).

Park, et al., *Multiple Target Tracking in a Wide-Field-of-VieW Camera System*, SPIE vol. 1304 Acquisition, Tracking, and Pointing IV, pp. 293-299, 1990.

Jung et al., *Dynamically tunable hemispherical electronic eye camera system with adjustable zoom capability*, PNAS vol. 108 (5), pp. 1788-1793, Feb. 1, 2011.

Brady and Hagen, *Multiscale lens design*, Optics Express, vol. 17 (13), pp. 10659-10674, Jun. 22, 2009.

Rogers, John, Stretchable Electronics—From Hemispherical Imagers to Neural Monitors, DARPA Microsystems Technology Office, Symposium, Mar. 2-5, 2009, San Jose, CA, U.S.

Cossairt, O. et al., *Gigapixel Computational Imaging*, IEEE International Conference of Computational Photography (ICCP) Mar. 2011.

Krishnan and Nayer, *Towards a True Spherical Camera*, SPIE Human Vision and Electronic Imaging, Jan. 2009.

*AF112-017 Curved Sensor for Vision Systems*, 3 pages, available online: http://www.afsbirsttr.com/TopicPreRelease/Profile.aspx?pk=21317, admitted prior art.

International Preliminary Report on Patentability and Written Opinion of the International Searching Authority; International Application No. PCT/US2012/000113, International Filing Date: Mar. 1, 2012; Date of Mailing: Apr. 3, 2014; pp. 1-9.

International Partial Search Report mailed Jun. 18, 2012 in PCT/US2012/000113.

\* cited by examiner

LWIR Layout

NOTE: APERTURE STOP AP OF DIAMETER 1.8 INCH IS PLACED
IN THE VICINITY OF THE MONOCENTRIC CENTER;
R1-R6 REFER TO SURFACE RADII

LWIR Transverse Ray Fan Plot

LWIR PRESCRIPTION

| MATERIAL | SURFACE RADIUS | INCHES |
|---|---|---|
| ZnSe | R1 | 4.04902 |
| GaAs | R2 | 2.29278 |
| KRS-5 | R3 | 1.54420 |
| GaAs | R4 | -1.54420 |
| Air | R5 | -3.52227 |
| FPA | R6 | -4.18815 |

NOTE: AN APERTURE STOP OF DIAMETER 1.8 INCH IS PLACED IN THE VICINITY OF THE MONOCENTRIC CENTER; R1-R6 REFER TO SURFACE RADII

LWIR Layout

NOTE: AN APERTURE STOP OF DIAMETER 1.75 INCH IS PLACED
IN THE VICINITY OF THE MONOCENTRIC CENTER;
R1-R6 REFER TO SURFACE RADII

LWIR Transverse Ray Fan Plot

LWIR PRESCRIPTION

| MATERIAL | SURFACE RADIUS | INCHES |
|---|---|---|
| ZnS | R1 | 4.15297 |
| Germanium | R2 | 2.12106 |
| Gasir1 | R3 | 1.49503 |
| Germanium | R4 | -1.49503 |
| Air | R5 | -3.52293 |
| FPA | R6 | -4.18893 |

NOTE: AN APERTURE STOP OF DIAMETER 1.75 INCH IS PLACED IN THE VICINITY OF THE MONOCENTRIC CENTER; R1-R6 REFER TO SURFACE RADII

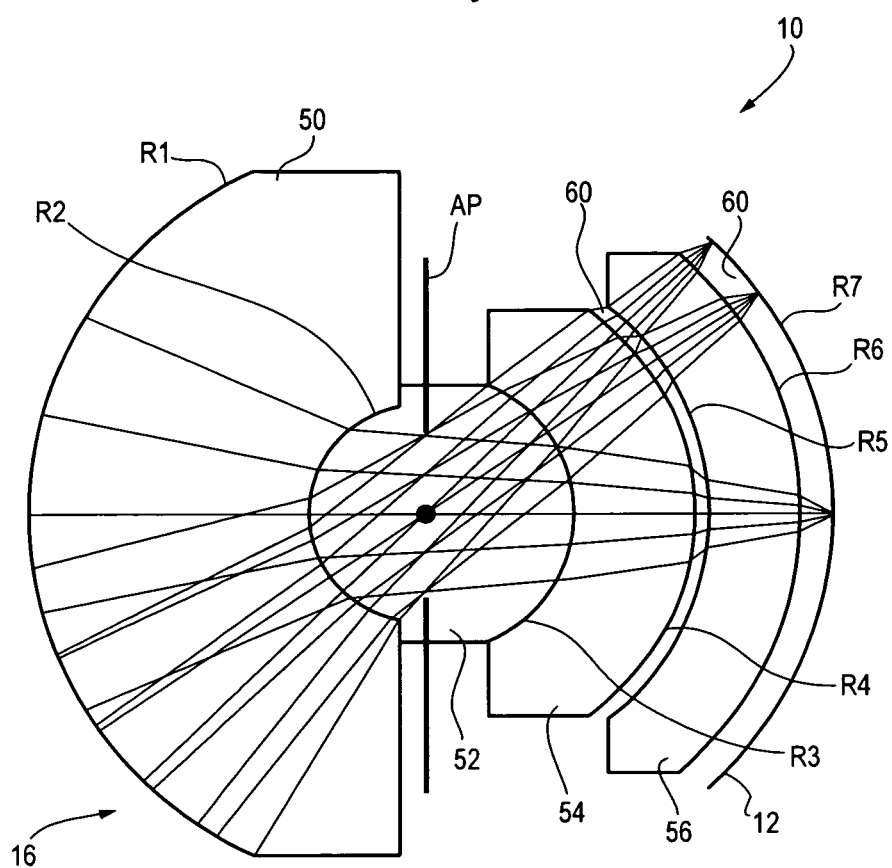

MWIR Transverse Ray Fan Plot

MWIR PRESCRIPTION

| MATERIAL | SURFACE RADIUS | INCHES |
|---|---|---|
| Ge | R1 | 2.41901 |
| AMTIR1 | R2 | 0.69606 |
| ZnS | R3 | -0.91170 |
| Air | R4 | -1.63030 |
| IG2 | R5 | -1.72715 |
| Air | R6 | -2.26982 |
| FPA | R7 | -2.46982 |

NOTE: AN APERTURE STOP OF DIAMETER 1.0 INCH IS PLACED
IN THE VICINITY OF THE MONOCENTRIC CENTER;
R1-R7 REFER TO SURFACE RADII

MWIR Layout

MWIR Transverse Ray Fan Plot

MWIR PRESCRIPTION

| MATERIAL | SURFACE RADIUS | INCHES |
|---|---|---|
| Si | R1 | 2.31147 |
| AMTIR1 | R2 | 1.02960 |
| Ge | R3 | -0.71432 |
| Air | R4 | -1.67872 |
| CaF2 | R5 | -1.81221 |
| Air | R6 | -2.22217 |
| FPA | R7 | -2.42217 |

NOTE: AN APERTURE STOP OF DIAMETER 1.0 INCH IS PLACED IN THE VICINITY OF THE MONOCENTRIC CENTER; R1-R7 REFER TO SURFACE RADII

MWIR Alternate Layout

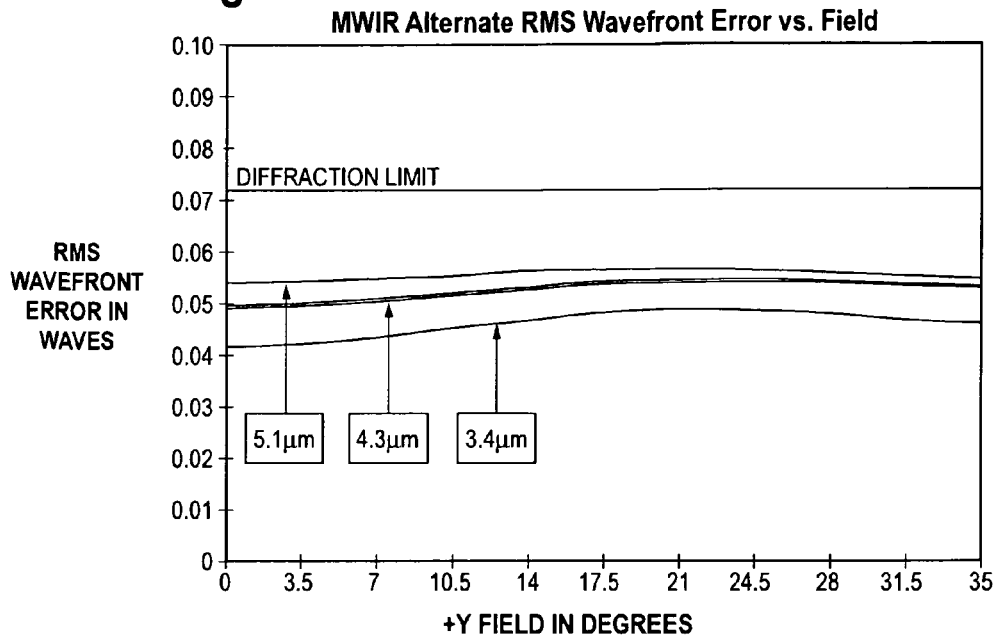
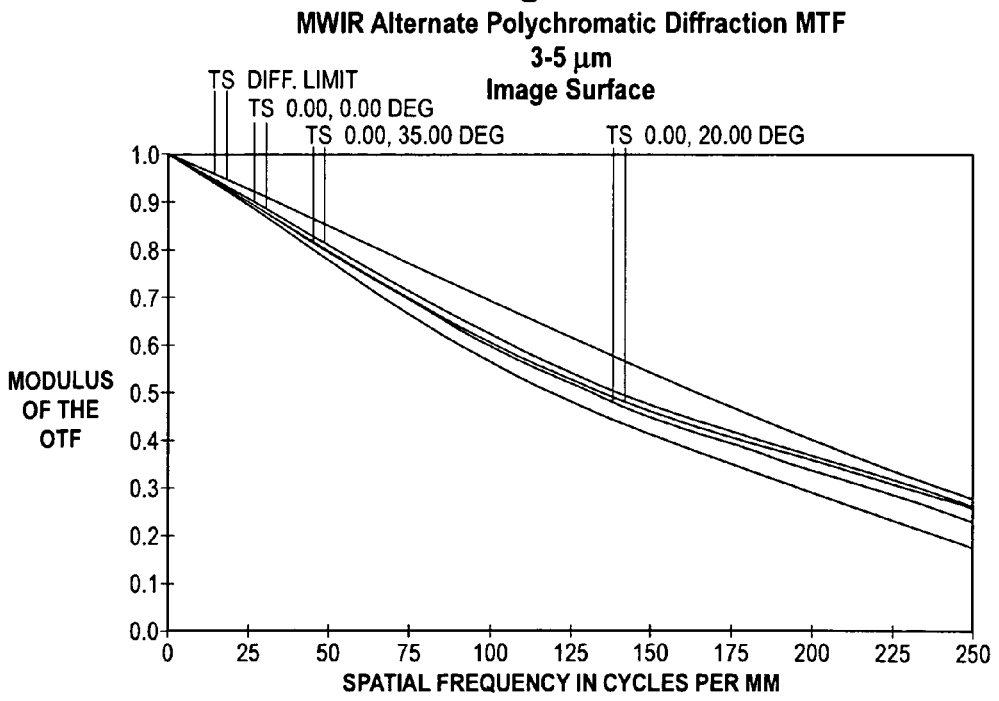

Fig. 5D
MWIR ALTERNATE PRESCRIPTION
| MATERIAL | SURFACE RADIUS | INCHES |
|---|---|---|
| Si | R1 | 3.11358 |
| Air | R2 | 2.23536 |
| Si | R3 | 2.10563 |
| Ge | R4 | -0.61347 |
| Si | R5 | -1.24084 |
| FPA | R6 | -1.38137 |
NOTE: AN APERTURE STOP OF DIAMETER 0.73 INCH IS PLACED IN THE VICINITY OF THE MONOCENTRIC CENTER; R1-R6 REFER TO SURFACE RADII
Fig. 6A
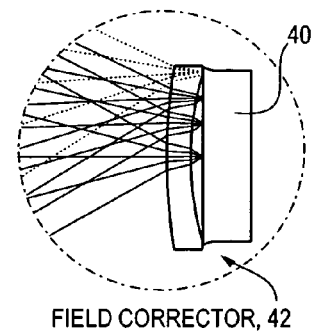
FIELD CORRECTOR, 42
Fig. 6
Monocentric Lens and Curved Focal Plane Detector Sub Arrays with Field Corrector Optics
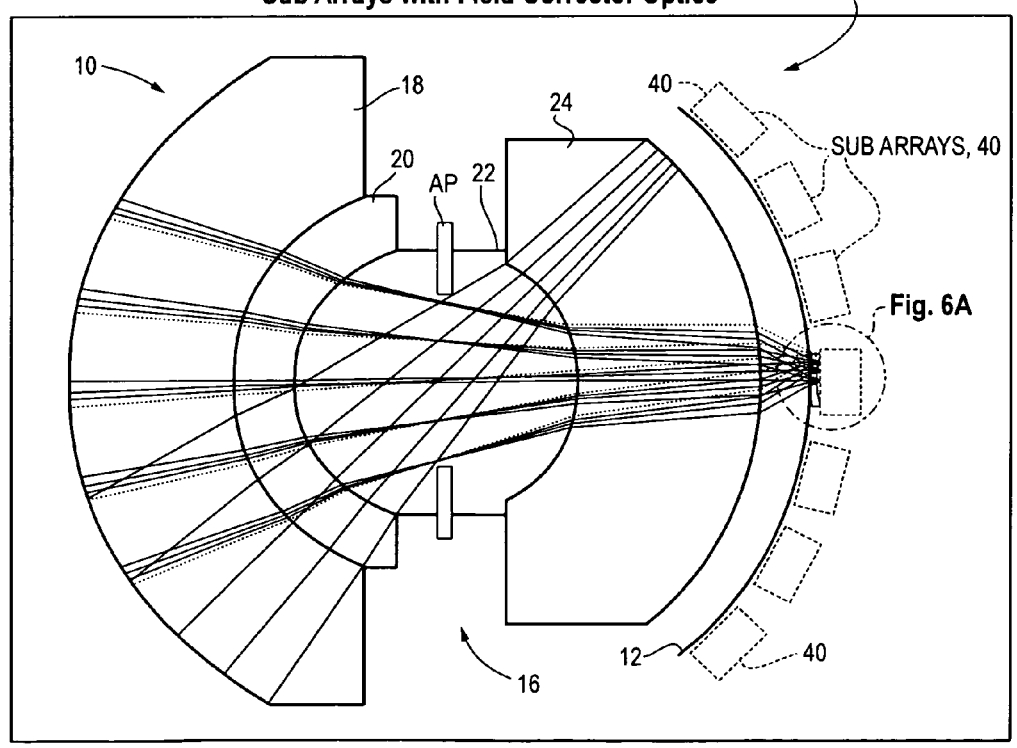

SWIR Layout

Fig. 7D
SWIR Prescription
| MATERIAL | SURFACE RADIUS | INCHES |
|---|---|---|
| N-KZFS2 | R1 | 1.85581 |
| Si | R2 | 1.48131 |
| ZnS | R3 | .761653 |
| Si | R4 | -0.66689 |
| Air | R5 | -1.54947 |
| FPA | R6 | -2.15619 |
NOTE: AN APERTURE STOP OF DIAMETER 0.72 INCH IS PLACED IN THE VICINITY OF THE MONOCENTRIC CENTER; R1-R6 REFER TO SURFACE RADII
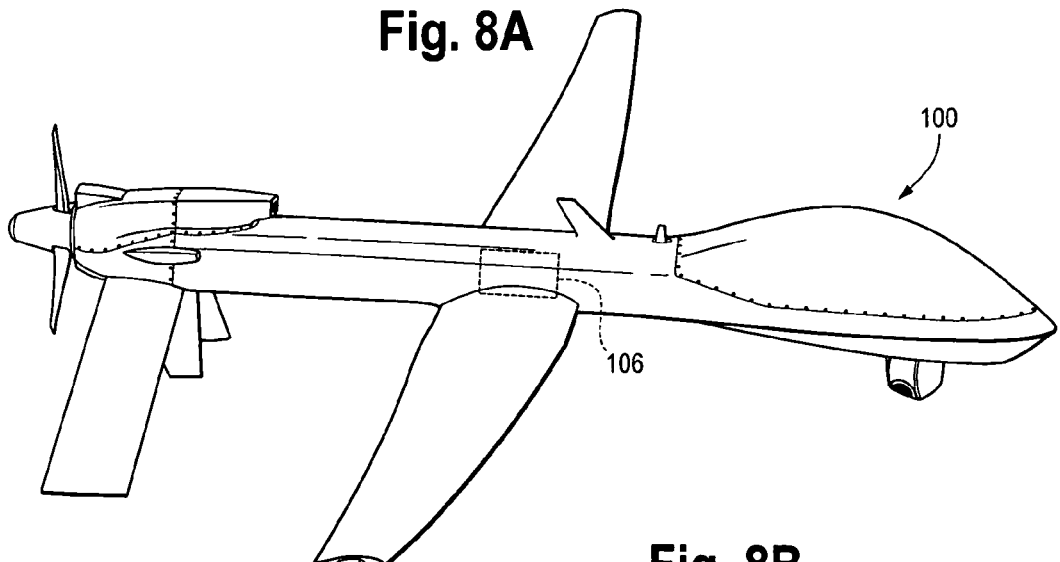
Fig. 8A
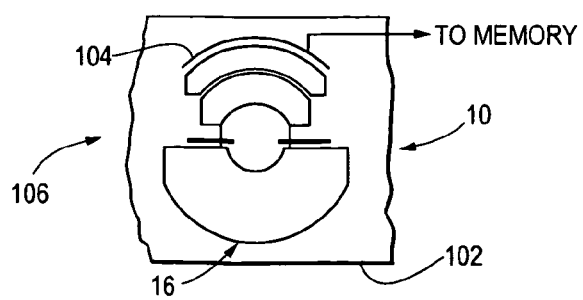
Fig. 8B

WIDE FIELD OF VIEW MONOCENTRIC LENS SYSTEM FOR INFRARED AERIAL RECONNAISSANCE CAMERA SYSTEMS

CROSS-REFERENCE TO RELATED APPLICATIONS

None.

STATEMENT OF GOVERNMENT SUPPORT

Not applicable.

FIELD

This disclosure pertains to the field of optical systems used in reconnaissance and surveillance cameras systems and in particular to electro-optical infrared (IR) camera systems having a wide field of view and high resolution. In one aspect, the disclosure is directed to a monocentric lens optical system design for use with a curved focal surface detector array to improve camera performance, and provide a wide field of view in a compact package. This disclosure also pertains to reconnaissance camera systems for use in unmanned aerial vehicles.

DESCRIPTION OF RELATED ART

Over the past decade, reconnaissance camera systems have been continually evolving to meet the need for increased performance and smaller size. Traditionally, reconnaissance camera systems were flown on manned aircraft and therefore Size, Weight, and Power (SWaP) requirements were not stringent. However, today these parameters are very important since the cameras are being integrated on smaller aerial platforms, and in particular Unmanned Aerial Vehicles (UAVs). New camera systems must therefore be smaller, more compact, lighter weight, consume less power, and still meet requirements for resolution and Field Of View (FOV).

Resolution and FOV are key reconnaissance camera performance parameters. In general, they are determined by the optical system and the size, pixel pitch and other parameters of the electro-optical image detector. Increased resolution typically means that the camera will have a larger optical system and longer focal length resulting in a bigger, heavier camera with a narrower FOV. While this trade off may be acceptable for larger manned aerial platforms, it is not acceptable for UAV platforms. This is especially true for reconnaissance camera systems utilized for wide area persistent surveillance (WAPS) applications on a UAV. Persistent surveillance missions require a very wide field of view (WFOV) camera without sacrificing resolution. Since the UAV is the preferred platform for persistent surveillance, the camera system must be compact, lightweight, and power efficient. This objective is even more difficult to realize for infrared camera systems which generally use large diameter lenses and cryogenic coolers for the image detectors.

It is well known in the art that an optical lens can be designed to convert an optical image into a focal image surface that is curved or spherical. Therefore, the performance of an imaging sensor system can be enhanced by constructing a curved focal surface array (FSA) detector to match the curved image focal surface of the lens. Basically this is how the human eye is constructed. Such imaging system architecture is more efficient and the optical system becomes less complex yet provides a wide field of view with good resolution. The optical system of this disclosure realizes this architecture through the use of a fast WFOV monocentric lens optical system in combination with a large format curved focal surface detector array.

Prior art of interest includes U.S. Pat. No. 5,668,593 currently assigned to the assignee of the present invention. The '593 patent uses a step framing approach in which a high resolution but narrow FOV camera is stepped across the scene to be imaged, thereby creating multiple frames of imagery. The camera system of the '593 patent is too large for many UAV applications. Another means to increase the camera FOV is to increase the format size of the electro-optical detector array, also described in U.S. Pat. No. 5,668,593; however, larger detector arrays require a larger diameter lens system, which adds weight and increases camera size. Still another means to provide a wide FOV is to utilize multiple cameras and combine the fields of view; however, such a configuration is mechanically cumbersome and requires significant post processing of the camera outputs. While both the mechanical step framing camera with a large focal plane array and the multiple camera arrangement have been successful for reconnaissance imaging on large manned platforms, the present invention provides a solution for obtaining wide FOV imagery with a smaller, lighter weight camera system suited for integration on UAV platforms.

Further prior art of interest includes U.S. Pat. No. 6,570,715 to Chen et al., which describes constructing a curved surface detector array using planar piecewise sensor chip arrays arranged in an arc on a curved support structure. The arrangement eliminates the need for a single, complex, monolithic, flexible, curved detector array. The use of a piecewise focal surface array comprised of multiple planar arrays (referred to herein as a mosaic of individual focal plane elements) is practical and can be used in the embodiments of the present invention. Chen utilizes the multiple planar detector arrays in a scanning sensor system having at least a spherical or ball lens, a dome lens, and a reflective surface (mirror) to direct scene radiation. Chen also casually mentions the possible use of lens materials applicable to operation in the infrared spectrum, but offers no detail.

A monocentric lens is a type of lens known in the art. A monocentric lens is characterized by having all element surfaces share a common center of curvature and by exhibiting uniform aberration levels over large fields of view. The lens architecture is simple yet capable of producing a wide field of view with good resolution and low aberration. In a paper titled "Galaxy Wars Optics", written for Optics News, June 1988, Shafer discusses and illustrates those benefits. Migliaccio, U.S. Pat. No. 5,311,611 describes a two element monocentric ball lens coupled to a fiber optic faceplate which serves as a third element to interface the lens to a planar focal surface detector. The optical system achieves a wide field of view with minimized aberrations over a wide spectral range including the near infrared band (NIR). Chen et al., U.S. Pat. No. 6,320,703, describes an electro-optical sensor configuration having a monocentric lens and curved focal surface detector; however, several differences highlight the improvements as taught by the present disclosure. It is significantly noted that although Chen describes a WFOV concentric ball lens assembly in combination with a curved focal surface detector array, he fails to provide any detail whatsoever for the lens design, fabrication, and performance.

This invention meets a previously unmet need in the art for a high resolution, wide field of view optical system for an infrared reconnaissance camera suitable for UAV applications.

SUMMARY OF THE INVENTION

In a first aspect, a compact, light-weight, wide field of view optical system for a long wavelength infrared (LWIR) aerial reconnaissance camera is disclosed. For purposes of this disclosure, the LWIR band is considered to include the band of radiation having a wavelength of between 8 micrometers (8 µm) and 12 micrometers (12 µm). The optical system includes a curved focal surface and a wide field of view monocentric lens system. The monocentric lens system includes a first front shell lens element and a second front shell lens element, a core lens element, and a rear shell lens element. The first and second front shell lens elements and the rear shell lens elements are concentrically arranged about the core lens element center such that infrared radiation entering the monocentric lens passes sequentially through the first and second front shell lens element, the core lens element, and the rear shell lens element and is focused onto the curved focal surface.

The first and second front shell lens elements and the rear shell lens elements are made of material having a relatively higher refractive index or a relatively higher optical dispersion, or both in the LWIR band; the material is carefully selected to minimize chromatic aberration and spherical aberration as well as secondary chromatic aberration and spherochromatism, and pass radiation in the LWIR band. The core lens element is made from a material having a relatively lower refractive index or a relatively lower optical dispersion, or both, in the LWIR band, and carefully selected to compensate for spherical and chromatic aberration, as well as secondary chromatic aberration and spherochromatism. The terms "relatively higher" and "relatively lower" mean that the front and rear shell lens elements have a higher refractive index or higher optical dispersion than that of the core lens element.

Several preferred implementations of the LWIR embodiment are disclosed herein including specific materials for the first and second front shell lens elements, the core lens element and the rear shell lens elements. Preferred embodiments have a field of view of at least about 70 degrees, a focal length greater than 2.0 inches, and an F/# near unity (e.g. between about 0.9 and about 1.1). Preferred embodiments also feature near diffraction limited performance, the achievement of which is enabled by the selection of materials selected for the lens elements in the monocentric lens as described herein.

In one possible embodiment, the system further includes a curved focal surface detector array located at the curved focal surface. The curved focal surface detector can take the form of a curved array (as described later in this document) or alternatively it can take the form of a mosaic of discrete planar detector arrays placed about the curved focal surface. In one embodiment a corrector optic is placed in front of each of the planar detector arrays in the mosaic. The corrector optic can take the form of an optical window for each of the planar detector arrays in the mosaic.

In a second aspect, a compact, light-weight, wide field of view optical system for a mid-wavelength infrared (MWIR) aerial reconnaissance camera is disclosed. For purposes of this disclosure, the MWIR band is considered as encompassing the band of radiation having a wavelength of about 3 to about 5 micrometers (3 µm-5 µm). The system includes a curved focal surface and a wide field of view monocentric lens system. The monocentric lens system includes a front shell lens element, a core lens element, and a first rear shell lens element and a second rear shell lens element. The front shell lens element and the first and second rear shell lens elements are concentrically arranged about the core lens element such that infrared radiation entering the monocentric lens passes sequentially through the front shell lens element, the core lens element, and the first and second rear shell lens elements and is focused onto the curved focal surface. The front shell lens elements and the rear first lens elements are made of material having a relatively higher refractive index or a relatively higher optical dispersion, or both, in the MWIR band, the material carefully selected to minimize chromatic and spherical aberration as well as secondary chromatic aberration and spherochromatism, and pass radiation in the MWIR band. The core lens element is made from a material having a relatively lower refractive index or a relatively lower optical dispersion, or both, in the MWIR band, and carefully selected to compensate for spherical and chromatic aberration as well as secondary chromatic aberration and spherochromatism.

As was the case with the LWIR embodiment, several preferred implementations of the MWIR embodiment are disclosed herein including specific materials for the front shell lens element, the core lens element and the rear shell lens elements. Preferred embodiments have a field of view of at least about 70 degrees, a focal length greater than 2.0 inches, and an F/# near unity (e.g. between about 0.9 and about 1.1). Preferred embodiments also feature near diffraction limited performance, the achievement of which is enabled by the selection of materials selected for the lens elements in the monocentric lens as described herein.

In one possible embodiment, the system further includes a curved focal surface detector array located at the curved focal surface. The curved focal surface detector can take the form of a curved array or alternatively it can take the form of a mosaic of discrete planar detector arrays placed about the curved focal surface. In one embodiment a corrector optic is placed in front of each of the planar detector arrays in the mosaic. The corrector optic can take the form of an optical window for each of the planar detector arrays in the mosaic to compensate for spherical and chromatic aberration.

In yet another aspect, a compact, light-weight, wide field of view optical system for a short wavelength infrared (SWIR) aerial reconnaissance camera is disclosed. For purposes of this disclosure the SWIR band is considered to encompass the band from about 1.2 micrometers to about 3 micrometers (1.2 µm to 3 µm). The system includes a curved focal surface and a wide field of view monocentric lens system. The monocentric lens system includes a first front shell lens element and a second front shell lens element, a core lens element, and a rear shell lens element. The first and second front shell lens elements and the rear shell lens elements are concentrically arranged about the core lens element center such that infrared radiation entering the monocentric lens passes sequentially through the first and second front shell lens element, the core lens element, and the rear shell lens element and is focused onto the curved focal surface. The first and second front shell lens elements and the rear shell lens elements are made of material having a relatively higher refractive index or a relatively higher optical dispersion, or both, in the SWIR band, the material carefully selected to minimize chromatic and spherical aberration as well as secondary chromatic aberration and spherochromatism, and pass radiation in the SWIR band. The core lens element is made from a material having a relatively lower refractive index or a relatively lower optical dispersion, or both, in the SWIR band, and carefully selected to compensate for spherical and chromatic aberration as well as secondary chromatic aberration and spherochromatism.

In another aspect, the invention relates to aerial reconnaissance vehicles (manned or unmanned) having an infrared reconnaissance camera incorporating the compact, light-weight wide field of view infrared optical system as described herein for the LWIR, MWIR or SWIR embodiments.

BRIEF DESCRIPTION OF THE DRAWINGS

Presently preferred embodiments of the invention will be described in conjunction with the appended drawing figures, in which:

FIG. 3A is an illustration of the layout of a first embodiment of a compact MWIR optical system for a reconnaissance camera.

FIG. 5B is a plot of wavefront error vs. vs field for the embodiment of FIG. 5A.

FIG. 5C is a plot of the MWIR polychromatic diffraction modulation transfer function (MTF) for the embodiment of FIG. 5A.

FIG. 5D is a lens prescription for the embodiment of FIG. 5A.

FIG. 6 is layout of a monocentric lens having a curved focal plane showing an embodiment of a curved focal plane detector in the form of a mosaic of discrete planar sub-arrays arranged about the focal plane, each having a field corrector optic.

FIG. 7D is a lens prescription for the embodiment of FIG. 7A.

FIG. 8A is an illustration of an unmanned aerial vehicle and reconnaissance camera system incorporating an optical system as described herein.

FIG. 8B is a more detailed view of the reconnaissance camera system of FIG. 8A.

DETAILED DESCRIPTION

Figure 1A:
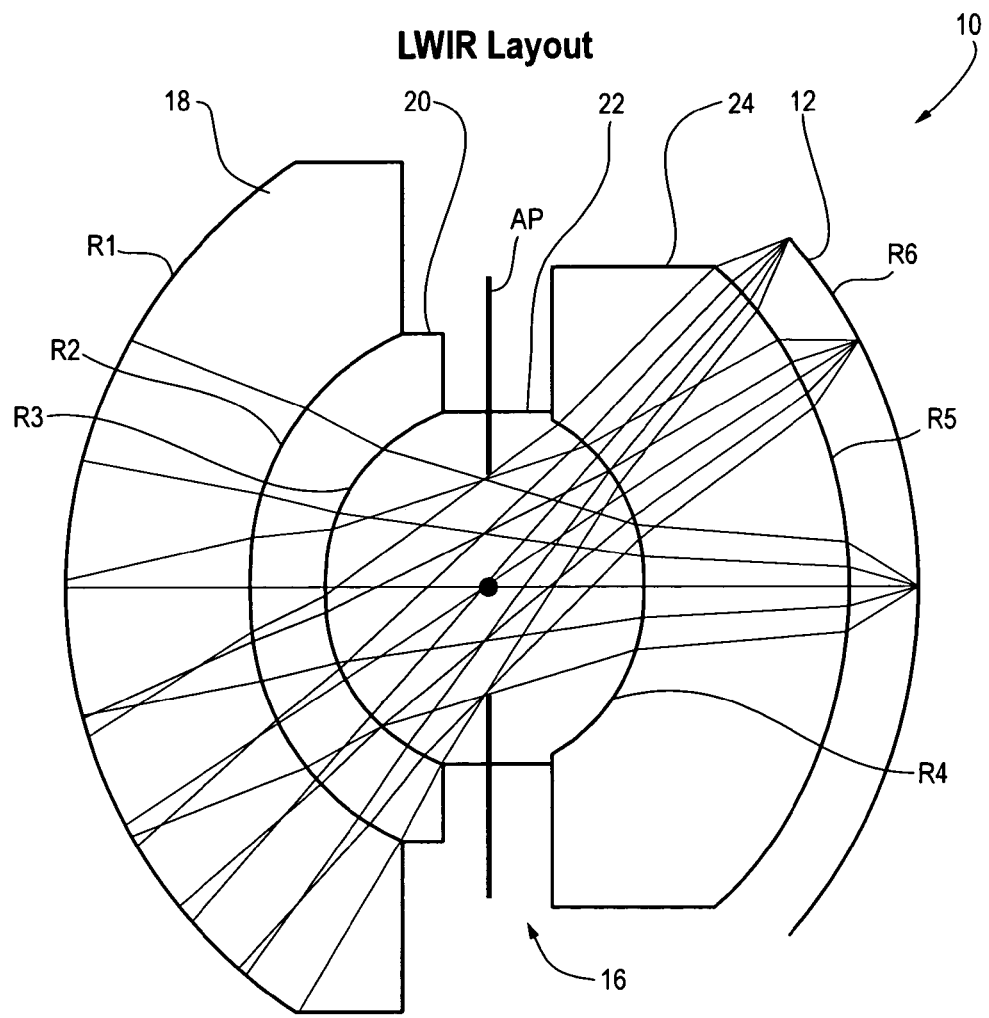
FIG. 1A is an illustration of the layout of a first embodiment of a compact LWIR optical system for a reconnaissance camera.

Compact, light-weight, wide FOV optical systems for an IR reconnaissance camera are described. The optical system includes a monocentric lens and a curved focal surface. Preferred embodiments include a curved focal plane detector located at the curved focal surface. The optical system is particularly advantageous for use in low to medium altitude infrared aerial reconnaissance camera systems operating in the LWIR, MWIR or SWIR. The optical system is further ideally suited for unmanned aerial vehicles where space and weight constraints are high. The present optical system enables the construction of a smaller, lighter reconnaissance camera suited for persistent surveillance applications hosted on UAV platforms.

Preferred embodiments include a high performance wide FOV monocentric infrared lens optimized for use with a large format curved focal plane infrared detector in the form of a single large curved array or alternatively a mosaic of individual curved detector arrays, or alternatively a mosaic of individual, planar detector arrays which are mounted on a curved focal surface. The mosaic of detector arrays can comprise linear arrays or two dimensional area arrays. In embodiments where a mosaic of planar detector arrays are utilized, each detector array optionally has an associated independent aspheric field curvature (flattening) corrector optic in front of it. In an alternative embodiment, the corrector optic takes the form of an optical window for each of the planar detector arrays in the mosaic.

This disclosure will set forth detailed designs for optical systems that are optimized for three different bands of the infrared spectrum: LWIR, MWIR and SWIR. Before describing the specifics of these embodiments, some general comments are made initially.

The optical system designs are optimized for application for an infrared (IR) wide field of view (WFOV) reconnaissance camera system such as a required for persistent surveillance. Lens design embodiments are presented for the long wave infrared (LWIR), medium wave infrared (MWIR), and short wave (SWIR) spectral bands and exhibit diffraction limited performance over a greater than 70 degree field of view (FOV) with an F number of approximately unity. These lens designs provide a significant performance improvement for an imaging system when integrated with a curved focal surface detector similar to those described in the prior art. The present invention enables the design and construction of an infrared imaging system which is more compact and lighter weight than the current art and features a very wide field of view and fast optics. The combination of the infrared monocentric lens and the curved surface focal detector yields an imaging solution applicable to requirements for persistent surveillance reconnaissance systems. The invention is especially attractive for use with uncooled infrared detectors in the LWIR and SWIR.

It is well known in the art that a simple optical lens produces a focal image surface that is curved or spherical (Petzval curvature), and therefore performance of an imaging system can be greatly enhanced by utilizing an image detector which has a matching curved focal surface. Although a curved focal surface image detector array is not new per se, such arrays are for the most part still developmental; so configuring a matched system is not yet easy or cost effective for commercial applications. Therefore, present day imaging systems use planar focal surface detector arrays which require a more complex lens system having internal optical elements that flatten the curved image focal surface to match the flat detector focal surface. However, several research groups have now developed various new methods of fabricating curved focal surface detectors thus paving way for development of new lenses that are optimized for use with these new curved detectors. Accordingly, the use of a curved focal surface detector, and an array or mosaic of individual flat detectors, are both considered suitable for implementation for use in the optical system of this invention.

Various techniques for fabrication of curved focal surface detectors can be found in the prior art and can be used in this disclosure. See e.g. the following references, the content of which is incorporated by reference herein. U.S. patent application publication 2010/0264502 to Christophersen et al; U.S. Pat. No. 6,849,843 to Ansorge et al; U.S. Pat. No. 6,985,184 to Sato; U.S. Pat. No. 7,742,090 to Street, and U.S. Pat. No. 7,786,421 to Nikzad et. al.; see also Iwert et al., *The Challenge of Highly Curved Monolithic Imaging Detectors*, conference poster paper, Detectors for Astronomy Workshop, Oct. 12-16, 2009, published in *Proceedings of the SPIE*, Volume 7742, pp. 774227-774227-9 (2010).

As noted above, this document describes an optical system for an IR reconnaissance camera which includes a wide field of view monocentric infrared lens and a curved focal surface. A monocentric lens is characterized by having all element surfaces share a common center of curvature and by exhibiting uniform aberration levels over large fields of view. The monocentric lens design examples of the present invention are optimized to provide high performance and wide field of view in the Long Wave Infrared (LWIR) or Medium Infrared (MWIR) or Short Wave Infrared (SWIR) spectral bands. The invention is especially attractive for use in the LWIR spectral band in conjunction with uncooled detectors. The invention enables the practical design and construction of an infrared reconnaissance imaging system which is smaller and lighter than the current art and yet provides the required features including wide field of view and high resolution.

Wide Area Persistent Surveillance (WAPS) reconnaissance camera systems provide persistent high resolution coverage over a very wide area. Recently deployed WAPS sensor systems operate from unmanned aircraft flying in a circular orbit over the region of interest. These sensors provide a much needed capability for real time surveillance, forensic backtracking, and anti-insurgent operations. The challenge faced by these sensors is to provide a large area of persistent coverage (typically 3 km diameter or more), at reasonable frame rates (>1 Hz) and at a high resolution (~0.3 m Ground Sample Distance (GSD)) throughout the region of interest. This type of operation is driving the sensor providers to dramatically increase the pixel count of the sensor's detector array. For the above situation, where pi=3.1416 and D=altitude in meters and GSD is the ground sampled distance; the number of effective pixels needed is given by:

$$\# \text{ Effective pixels} = \frac{pi * D^2}{4} * \frac{1}{GSD^2}$$
$$= \frac{pi * (3000 \text{ m})^2}{4} * \frac{1}{(0.3 \text{ m})^2}$$
$$= 78.5e6 \text{ pixels}$$

Therefore, under this hypothetical, 78,500,000 pixels are required for each frame of imagery. This very large number of pixels (especially large for the infrared spectrum) requires a large detector format and associated large sensor form factor according to traditional design techniques. Such a large infrared detector format is difficult to implement with a single monolithic array; however, by using a mosaic of smaller individual arrays the detector becomes more feasible.

Whereas a traditional WAPS sensor on a manned platform will fly at approximately 6 km Above Ground Level (AGL), a small UAV will fly at a lower altitude of typically 2 km; therefore the lower altitude WAPS sensor must now be capable of providing a very Wide Field of View (WFOV) to cover the same region of interest. The FOV required by a sensor operating at 2 Km altitude is given by:

FOV=2*tan$^{-1}$[(D/2)/Alt]=2*tan$^{-1}$[(3000 m/2)/2000 m]=74 degrees

The combination of a very wide field of view and a large detector format dictates the need for a sensor lens system that can provide high performance given these constraints. Traditionally a fish eye lens would provide the needed FOV, however, such lenses are very bulky relative to their aperture size and also need to correct for the Petzval curvature. Furthermore, achieving diffraction limited performance over large field angles while maintaing a low F# is extremely difficult with conventional lenses.

Therefore, the lens architecture of choice in this disclosure is the monocentric format which can provide a WFOV in a light weight, compact size which is needed for UAV sensor systems.

Preferred embodiments of this disclosure incorporate an IR imaging sensor that has a very large pixel count and very wide field of view (at least about 70 degrees), but within a very small size, weight and power (SWaP) envelope. By utilizing a very wide field of view, very compact, fast F/# optical system, the need for multi-axis steering and stabilization of the sensor is eliminated, and further decreases the SWaP of the system. This approach also provides exceptional situational awareness capability since a very large region of interest can be simultaneously interrogated using a small sensor, thereby enabling Wide Area Persistent Surveillance modalities and operation on small UAVs.

As noted above, the basic monocentric lens design shown in the appended drawings are characterized by an architecture where all surfaces share a common center of curvature. The monocentric format has definite advantages for applications where compact size, wide field of view, longer focal length, and a fast F# are important, such as persistent surveillance reconnaissance cameras. The monocentric lens is most effective when designed in conjunction with a curved focal surface detector having a curvature which matches the image focal surface curvature of the lens. Therefore, defining the detector architecture in conjunction with the lens design is important. Establishing an optimal monocentric lens design is a nontrivial iterative task requiring the designer to direct the design to the application and associated spectral band of interest. High performance thermal imaging reconnaissance cameras typically require a large lens having a long focal length and fast F#; therefore an optimized monocentric lens design provides a good solution. However, finding the prescription for the best performance and the means to realize it is difficult. The design challenge is to create the highest performance lens possible using the fewest number of elements having material compositions which, when combined in the proper sequence, balance spherical aberration, first order and secondary chromatic aberrations, and spherochromatism with minimum material absorption. The term "spherochromatism" is defined as the change of spherical aberration with wavelength. In the design process, the lens element materials are selected for their optical properties in the desired infrared spectral band with careful regard to refractive index, dispersion, and absorption. Since the selection of appropriate materials is limited, the number of optimized design solutions is also limited. In other words, it is not trivial to generate an optimized monocentric lens prescription, especially in the infrared, having the least number of elements correctly composed of specific material types and correctly sequenced to minimize aberrations and absorption.

Several of the designs disclosed below are optimized for the long wave infrared (LWIR) and medium wave infrared (MWIR) spectral bands for use in conjunction with a curved focal surface. See FIGS. 1A-5D. It should be noted that a monocentric lens design in short wave infrared, (SWIR) is also possible and described herein as a further embodiment in conjunction with FIGS. 7A-7D. Cameras incorporating the optical system of this disclosure can be used in a scanning mode or a snapshot mode camera system. The preferred embodiments of the invention are directed for application in mid to low altitude infrared reconnaissance cameras for persistent surveillance missions.

1. LWIR Embodiments

FIG. 1A is a layout of a first embodiment of a compact, light-weight, wide field of view optical system 10 suitable for use in a long wavelength infrared (LWIR) aerial reconnaissance camera. The optical system 10 includes a curved focal surface 12. A curved focal plane detector (not shown in FIG. 1A; see FIG. 6) as described below is positioned at the curved focal surface 12. The pixels of the detector (or mosaic of detectors) convert scene energy into electronic image signals which are transferred via an output register, then digitized and sent to a memory or signal processing electronics in known manner.

The optical system 10 includes a wide field of view monocentric lens system 16. The monocentric lens system 16 includes a first front shell lens element 18 and a second front shell lens element 20. The monocentric lens system includes a core lens element 22 and a rear shell lens element 24. As shown in FIG. 1A, the first and second front shell lens elements 18 and 20 and the rear shell lens elements 24 are concentrically arranged about the center of the core lens element 22 such that infrared radiation entering the monocentric lens passes sequentially through the first and second front shell lens elements 18 and 20, the core lens element 22, and the rear shell lens element 24 and is focused onto the curved focal surface 12.

The first and second front shell lens elements 18 and 20 and the rear shell lens element 24 are made of material having a relatively higher refractive index or a relatively higher optical dispersion, or both, in the LWIR band. The material for such lens elements is carefully selected to minimize chromatic and spherical aberration as well as secondary chromatic aberration and spherochromatism, and pass radiation in the LWIR band. Additionally, the core lens element 22 is made from a material having a relatively lower refractive index or a relatively lower optical dispersion, or both in the LWIR band (as compared to the lens shell elements 18, 20 and 24) and carefully selected to compensate for spherical and chromatic aberration as well as secondary chromatic aberration and spherochromatism.

Thus, the embodiment of FIG. 1A represents a four-element LWIR (8 µm-12 µm) wavelength lens design. The disclosed embodiment provides diffraction limited performance at half field angles up to 45 degrees. The lens 16 has a focal length of approximately 4.2 inches, F # of approximately unity, and a total field of view (FOV) of 90 degrees. An aperture stop (AP in FIG. 1A) is formed near the center of the core element 22 by grinding away material around the circumference of the core 22. An alternate method described in the prior art utilizes a two-piece core element 22 with an aperture stop material sandwiched between the two pieces forming the aperture stop.

The design of FIG. 1A can be altered to increase the FOV to 120 degrees or more if required while preserving diffraction limited performance. The focal lengths could be reduced to approximately 2 inches such that the lens would exhibit modified performance providing a wider FOV and/or faster F#.

The design of FIG. 1A is optimized to provide a wide field of view in conjunction with a curved focal surface detector placed at the focal surface 12. The curved focal surface detector could be monolithic, or take the form of a tiled array or mosaic of =cooled microbolometer-type detector arrays sensitive in the 8-12 micrometer (µm) wavelength LWIR spectral band. Furthermore, in the illustrated embodiment the lens 16 is optimized for application in a thermal infrared reconnaissance camera flying on smaller UAV platforms and imaging targets from altitudes of 3,000-10,000 feet above ground (AGL).

In the design of FIG. 1A, the core element 22 has a positive, convergent power and is made of a material having a relatively lower refractive index or a relatively lower optical dispersion, or both in the LWIR band (as compared to the lens shell elements 18, 20 and 24) to compensate for spherical and chromatic aberration. The front shell elements 18 and 20 as well as the rear shell element 24 have negative, divergent powers and are made from materials having a relatively higher refractive index or a relatively higher optical dispersion, or both, in the LWIR band. Secondary chromatic aberrations and spherochromatism are minimized by selection of the material for each element. The optimization process also involves the complete specification of the lens shell elements located in the front and the back of the core including their sequence and radii of curvature from the common center. In the embodiment of FIG. 1A, the core element 22 is fabricated from Thallium Bromoiodide (KRS-5). Alternatively, one of the Chalcogenide glasses such as IG2, AMTIR-1, or GASIR-1 could also be used.

The shell lens elements 18, 20 and 24 are selected for high refractive index or high dispersion, or both, and are made from either germanium (Ge) or gallium arsenide (GaAs); for such shells selected for high optical dispersion the shell lens elements are made from either zinc sulfide (ZnS) or zinc selenide (ZnSe). In the specific embodiment of FIG. 1A, the shell element 18 is made from ZnSe, shell element 20 is made from GaAs, and rear shell lens element 24 is made from GaAs and the core lens element 22 is fabricated from KRS-5.

Aperture stop AP is located near the center of core element 22.

A controlled air gap 30 separates the rear shell element 24 from the curved detector focal surface 12.

Figure 2A:
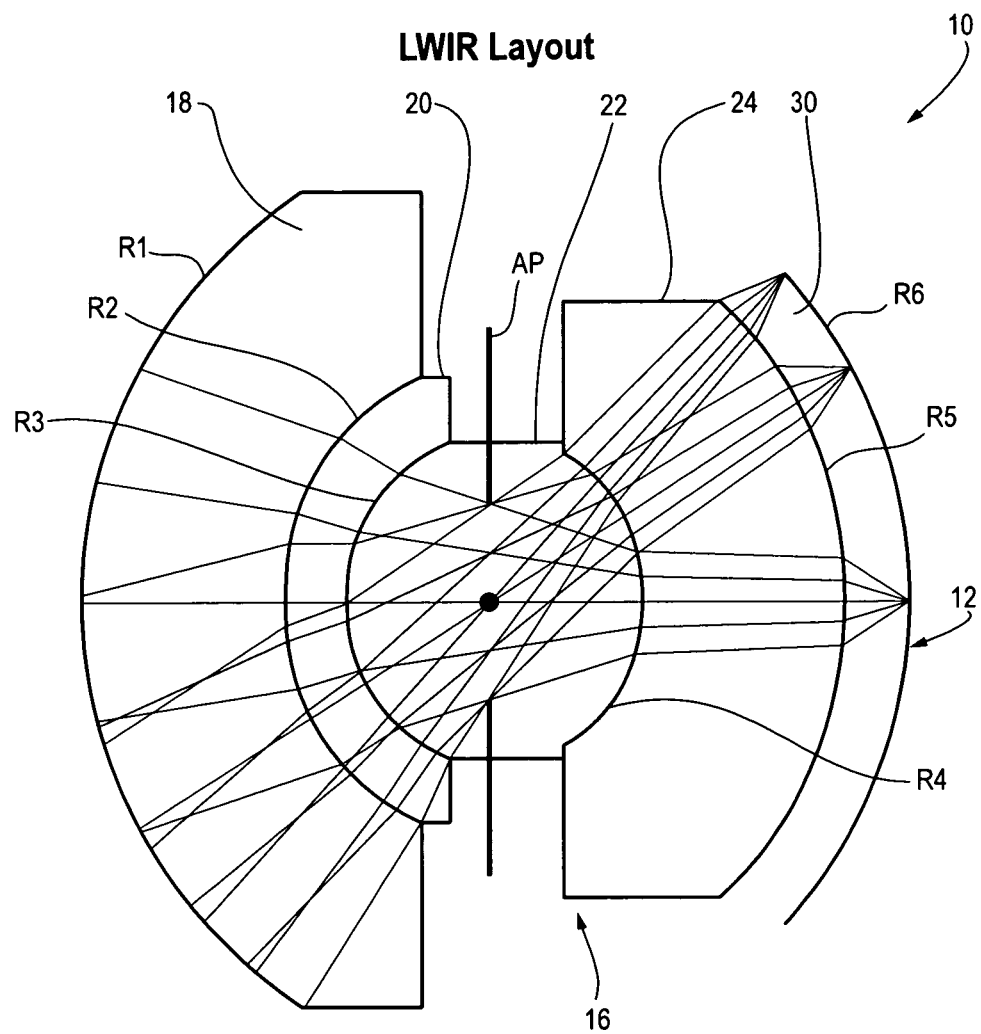
FIG. 2A is an illustration of the layout of a second embodiment of a compact LWIR optical system for a reconnaissance camera.

FIG. 2A is an illustration of a layout of a second embodiment of the LWIR optical system 10 similar to the embodiment in FIG. 1A. The general remarks regarding the construction and arrangement of the system of FIG. 1A apply to FIG. 2A, with the exception that the selection of specific materials is different. In FIG. 2A, front shell 18 is made from ZnS, front shell 20 is made from Ge, rear shell 24 is made from Ge and the core 20 is fabricated from GASIR-1. A controlled air gap 30 separates the rear shell element 24 from the curved detector focal surface 12.

The materials selected for the lens of FIG. 1A provide improved transmissivity at the longer wavelengths of the LWIR band as compared to the lens of FIG. 2A.

Figure 1B:
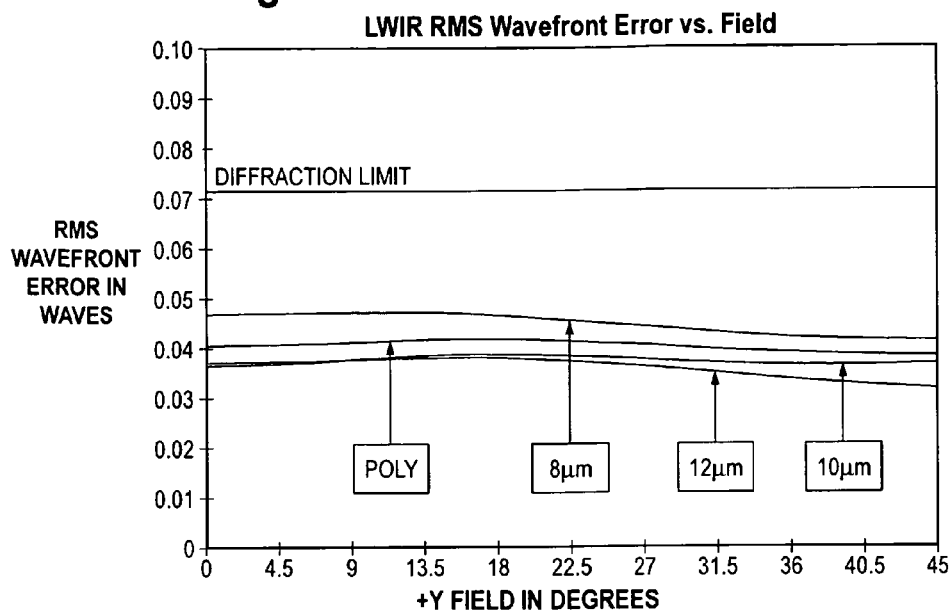
FIG. 1B is a plot of wavefront error vs. field for the embodiment of FIG. 1A.
Figure 2B:
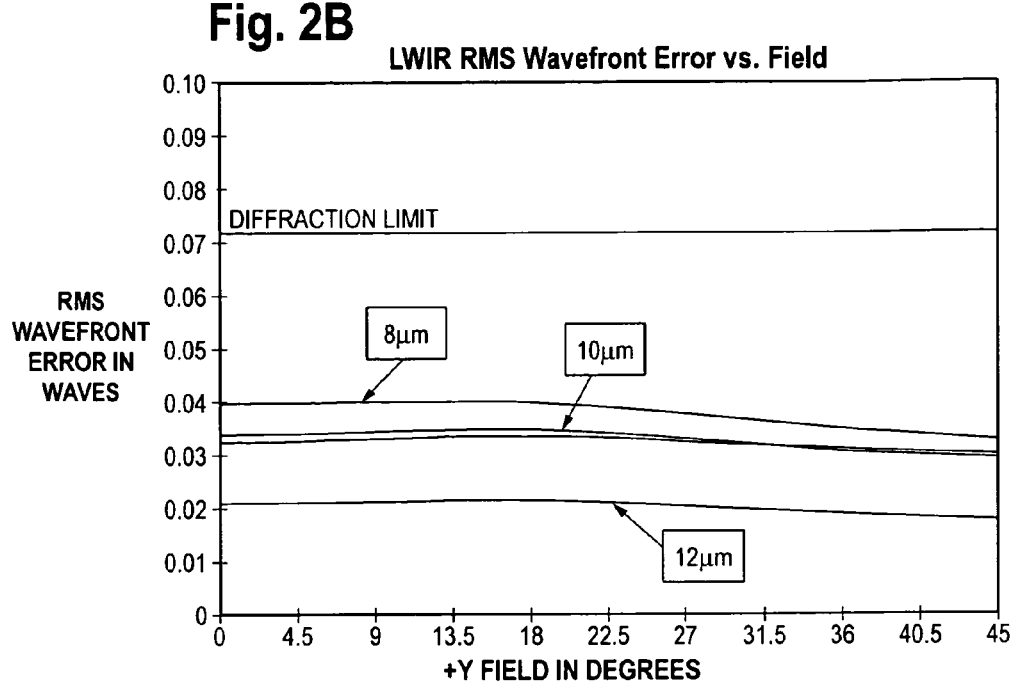
FIG. 2B is a plot of wavefront error vs. field for the embodiment of FIG. 2A.

FIGS. 1B and 2B illustrate the RMS (root mean square) wavefront error for the lenses of FIGS. 1A and 2A, respectively.

Figure 1C:
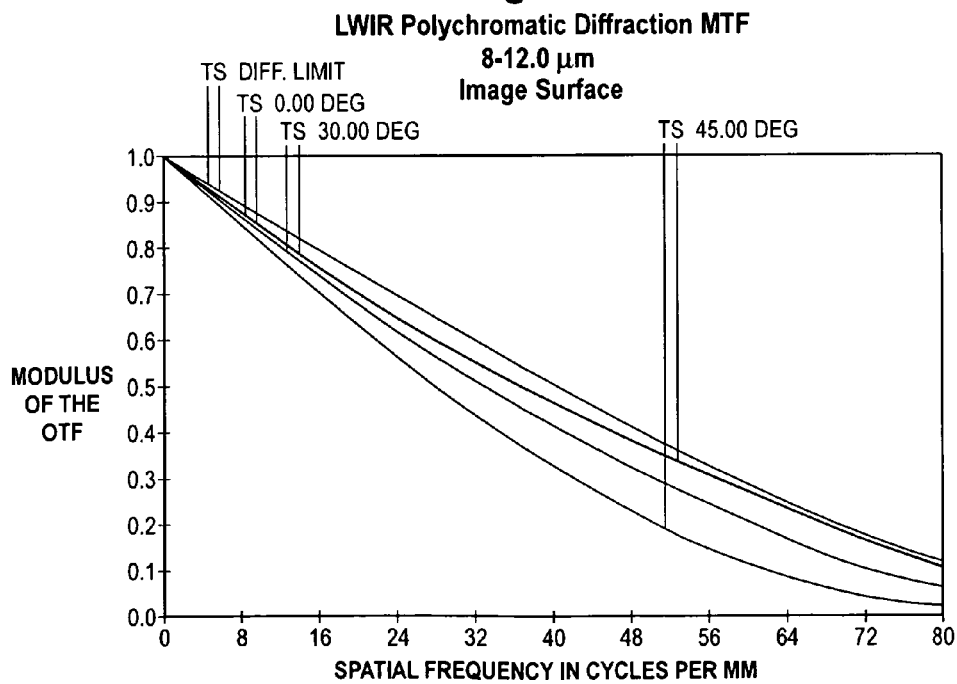
FIG. 1C is a plot of the LWIR polychromatic diffraction modulation transfer function (MTF) for the embodiment of FIG. 1A.
Figure 2C:
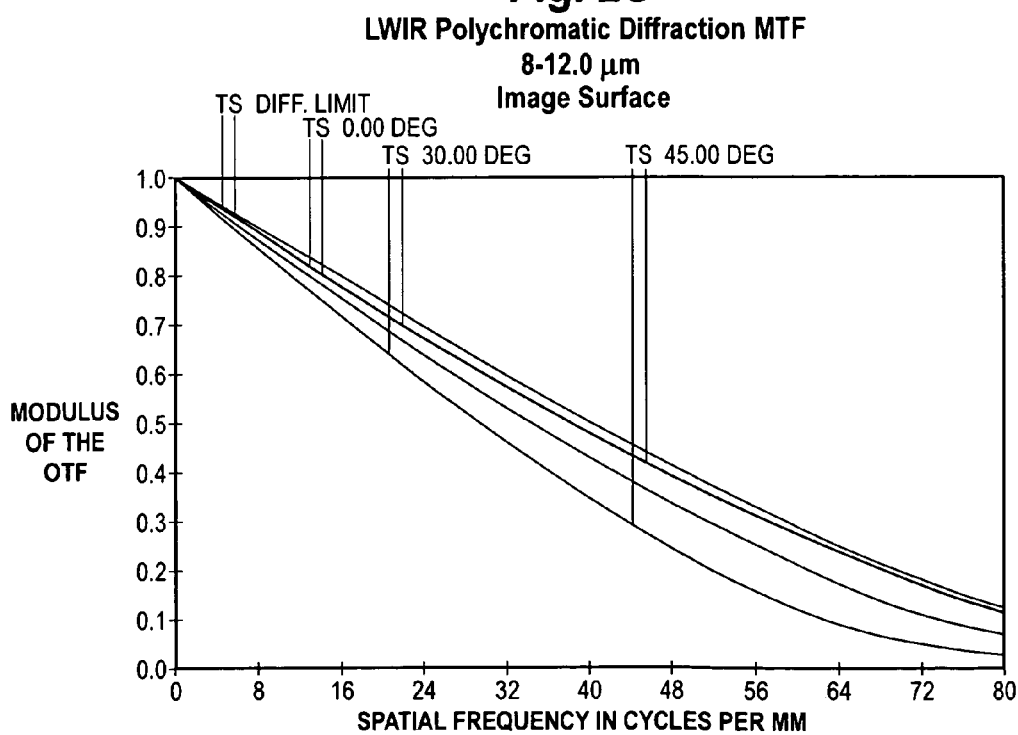
FIG. 2C is a plot of the LWIR polychromatic diffraction modulation transfer function (MTF) for the embodiment of FIG. 2A.

FIGS. 1C and 2C show the polychromatic diffraction MTF for the lenses of FIGS. 1A and 2A, respectively.

Figures 1D, 1E:
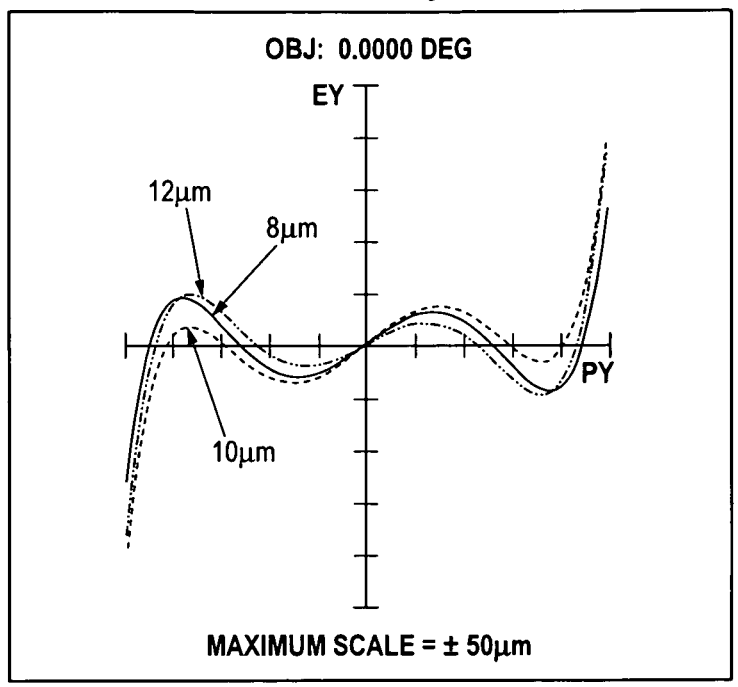
FIG. 1D is a LWIR transverse ray fan plot for the embodiment of FIG. 1A.
FIG. 1E is a lens prescription for the embodiment of FIG. 1A.
Figures 2D, 2E:
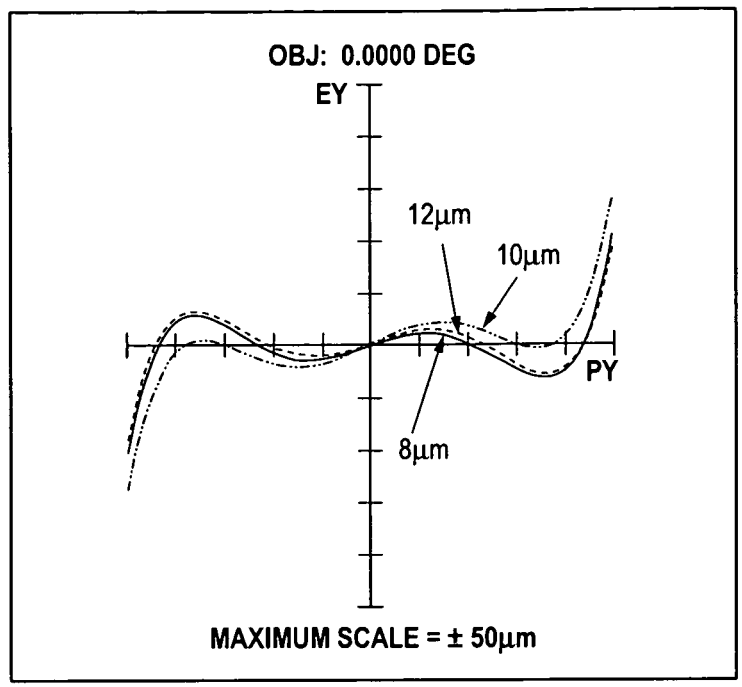
FIG. 2D is a LWIR transverse ray fan plot for the embodiment of FIG. 2A.
FIG. 2E is a lens prescription for the embodiment of FIG. 2A.

FIGS. 1D and 2D depict the transverse ray fan plot for the lenses of FIGS. 1A and 2A, respectively.

FIGS. 1E and 2E give the prescription for the lenses of FIGS. 1A and 2A, respectively. The lens prescription tables of FIGS. 1E and 2E describe the material composition for each element, the element sequence, surfaces, and corresponding radii of curvature for the lens designs of FIGS. 1A and 2A. The thickness of lens elements can be determined from the radii of curvatures given in the tables. Both designs are optimized for a WFOV LWIR reconnaissance sensor operating at altitudes between 3,000 and 10,000 feet AGL such as on a UAV platform (see FIG. 8). The WFOV designs minimize the need for stabilization or multi-axis steering of the sensor.

An anti-reflective or protective coating may be used on the surfaces of the elements of the lens 16 to enhance transmission.

Although an all air gap design is possible, the preferred LWIR embodiments of FIGS. 1A and 2A do not specify "air" gaps to separate all elements, but rather a contacting method is used where applicable resulting in better overall optical performance. Lens elements are considered in contact when the gap between them is one wavelength or less; therefore, a contact gap is more easily achieved at infrared wavelengths, especially in the LWIR. The LWIR designs of FIGS. 1 and 2 can therefore use more conventional means to contact the elements.

Three methods are described below for joining the contacted elements:

1.) Indirect Optical Contacting: Conventional AR coatings can be used on both element surfaces with a vapor-deposited metal ring around the periphery in conjunction with retainer rings which press the elements together so they make contact through the vapor-deposited ring. The vapor-deposited metal annulus can be gold which reflects any incident radiation. This contacting method however does produce a small "air" gap between the elements. However, deposition of the metal ring provides nanoscopic control of the gap thickness. This small "air" gap actually resides in a vacuum when the lens is integrated with a cooled detector dewar or the small gap can be filled with a gas such as nitrogen, and not necessarily "air", for uncooled applications.

2.) Direct Optical Contacting: The elements can be made with surfaces having equal convex and concave radii such that when pressed together, the surfaces attract and bond to each other. This technique requires greater control on the radii and avoids the cost of the AR coatings and spacer rings. It should be noted that when using uncooled microbolometer detector arrays, cryogenic temperature cycling is avoided making the contacting method more feasible.

3.) Bonded Contacting: The LWIR lens elements cannot be joined using common bonding materials employed for the visible spectrum since such materials are opaque in the LWIR spectral band. However a bonding method and adhesive such as that described by Myers et. al. U.S. Pat. No. 6,399,190 as applicable to the MWIR spectral band may be possible for the LWIR band as appropriate materials become available.

LWIR Detector

One possible example of a curved focal surface 12 and associated detector 14 for the LWIR embodiments of FIGS. 1A and 2A is illustrated schematically in FIG. 6. In one embodiment, the curved focal surface detector 14 takes the form of a tiling or mosaic of discrete planar detector arrays 40 which are placed at curved focal surface 12 of the monocentric lenses as illustrated in FIGS. 1A and 2A. The planar sub array detectors 40 are not shown to scale, and in practice would be placed closer together than is illustrated in FIG. 6. The discrete planar detector arrays are utilized since they are readily available and are less expensive compared to custom curved detectors or a single custom monolithic curved detector array. The preferred embodiment utilizes a mosaic of uncooled microbolometer arrays 40 sensitive in the 8-12 spectral wavelengths, such as the 17 µm, 1024×768 pixel array manufactured by BAE systems or similar arrays developed by DRS and Sofradir. However, an LWIR detector array fabricated from Mercury Cadmium Telluride (MCT) or other material sensitive in the 8-12 µm spectral band is also possible for the detectors 40 when a cooling means is employed. The detector 40 can be configured with an aspheric field corrector (flattening) optic 42 for each sub array as depicted in FIG. 6. The prescription for the field corrector optic 42 is not given since it is a simple two surface aspheric field flattening optic as known in the art. Alternatively a small relay lens (not shown), as taught in the prior art, could be used with each detector array 40 to spread the image and avoid possible gaps in the detected image due to the separate detector arrays. The corrector optic 42 is proximate to each detector array 40 and flattens the lens image surface as required since the individual detectors are planar even though they are placed on a curved surface.

In another embodiment, the corrector optic 42 may be implemented as the optical window of each of the detector arrays.

The lens designs of the present invention could also be utilized with tiled curved detector arrays or a monolithic curved array without the need for a field corrector optic or relay lens. However in the presence of field corrector optics, the lens prescriptions of the present invention may require slight adjustment.

The individual arrays 40 can take the form of a two dimensional area array or a linear array, e.g., Time Delay and Integrate (TDI) array. The individual arrays can be curved instead of planar, in which case the field corrector optic 42 is typically not required 2. MWIR Embodiments FIGS. 3A, 4A and 5A illustrate three different alternative embodiments of a compact, light weight wide field of view infrared optical system 10 for a MWIR reconnaissance camera.

Figure 3B:
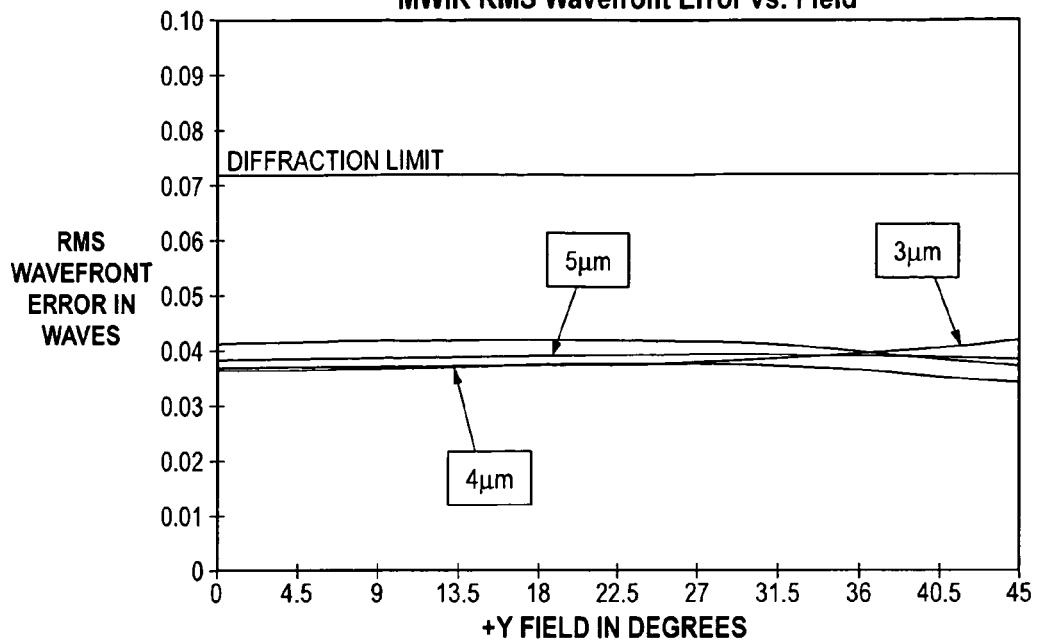
FIG. 3B is a plot of wavefront error vs. field for the embodiment of FIG. 3A.
Figure 4A:
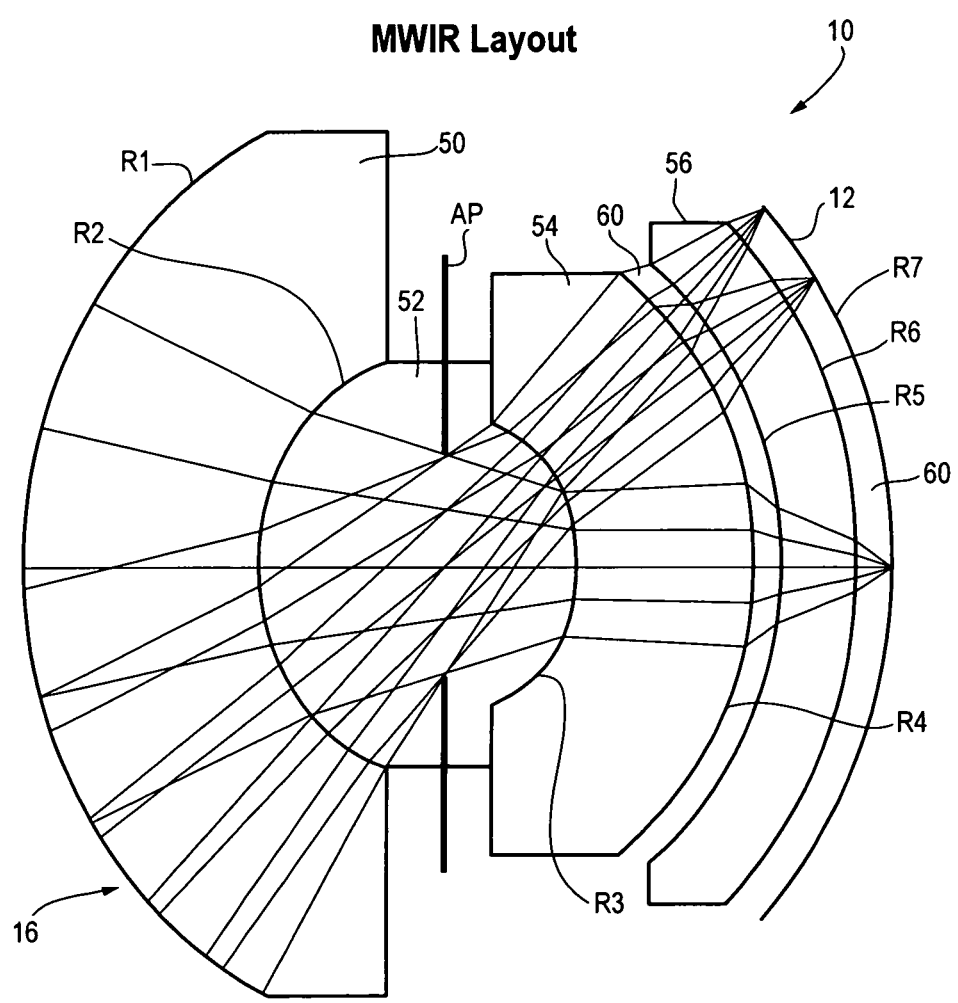
FIG. 4A is an illustration of the layout of a second embodiment of a compact MWIR optical system for a reconnaissance camera.

The designs of FIGS. 3A and 4A share several common features, namely a curved focal surface 12, and a wide field of view monocentric lens system 16. The monocentric lens system 16 includes a front shell lens element 50, a core lens element 52, a first rear shell lens element 54 and a second rear shell lens element 56. The front shell lens element 50 and the first and second rear shell lens elements 54 and 56 are concentrically arranged about the core lens element 52 such that infrared radiation entering the monocentric lens 16 passes sequentially through the front shell lens element 50, the core lens element 52, and the first and second rear shell lens elements 54, 56 and is focused onto the curved focal surface 12. The front shell lens element 50 and the rear lens elements 54 and 56 have negative, divergent powers and are made of material having a relatively higher refractive index or a relatively higher optical dispersion, or both (as compared to the core lens element 52) in the MWIR band, with the material selected to minimize secondary chromatic aberration and spherochromatism, and pass radiation in the MWIR band. The core lens element 52 has a positive, convergent power and is made from a material having a relatively lower refractive index or a relatively lower optical dispersion or both (as compared to the lens elements 50, 54, and 56) in the MWIR band to compensate for spherical and chromatic aberration.

Figure 5A:
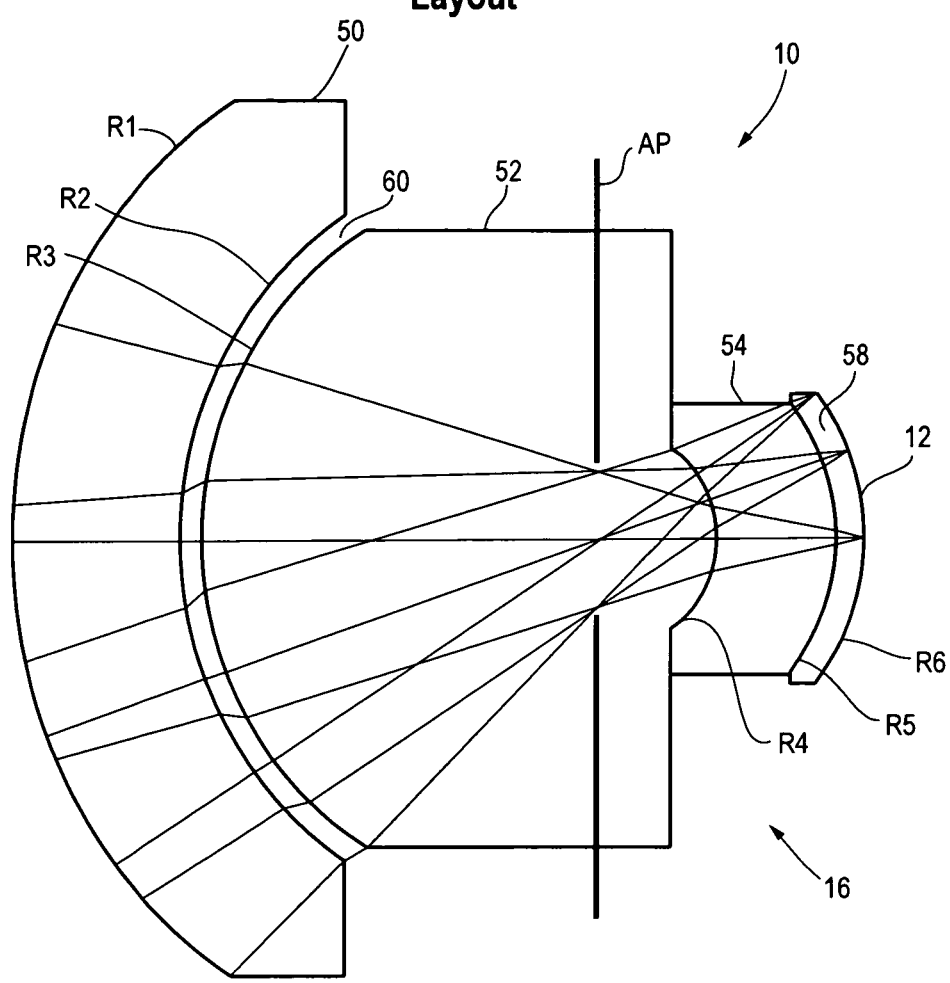
FIG. 5A is an illustration of the layout of a third embodiment of a compact MWIR optical system for a reconnaissance camera.

The embodiment of FIG. 5A includes front lens element 50, a core lens element 52 and rear lens shell elements 54 and 58. The front shell lens element 50 and the first rear lens elements 54 are made of material having a relatively higher refractive index or a relatively higher optical dispersion, or both, in the MWIR band (as compared to the core lens element 52), with the material selected to minimize secondary chromatic aberration and spherochromatism, and pass radiation in the MWIR band. The core lens element 52 has a positive, convergent power and is made from a material having a relatively lower refractive index or a relatively lower optical dispersion, or both, in the MWIR band (as compared to the lens elements 50, 54) to compensate for spherical and chromatic aberration. The MWIR monocentric lens 16 of FIG. 5A uses lens elements composed of only silicon and germanium. The FIG. 5A design has a focal length of around 1.4 inches, a fast F# of 0.58 and a 70 degree FOV. This design uses silicon for the core element 52 since it has low dispersion; but due to its high refractive index, the focal length cannot be as long as the MWIR designs of FIGS. 3A and 4A. There are notable advantages to using only silicon and germanium element materials; the design is easier to fabricate and facilitates simultaneous cooling of the lens and detector assembly. This is because the silicon and germanium materials are very compatible both having small and similar coefficients of thermal expansion. Since the MWIR detector requires cryogenic cooling, this lens design can fit inside the cooler with the detector. However, as with the MWIR lenses of FIGS. 3A and 4A, the coupling method utilized for the contacted lens elements must be implemented carefully due to the cryogenic temperature cycling involved. Another distinct advantage of using only silicon and germanium elements is that the detector 14/40 (FIG. 6) can be manufactured with a silicon layer over the pixel structure allowing the detector to be joined to the last lens element (58) which is also silicon.

The same design approach utilized for the LWIR monocentric lens core and shell elements (FIGS. 1A and 2A) is used for the MWIR spectral band The MWIR embodiments of FIGS. 3A, 4A and 5A provide diffraction limited performance at half field angles up to 45 degrees. The MWIR lenses of FIGS. 3A and 4A have an effective focal length (EFL) of approximately 2.5 inches, F# of approximately unity, and a total Field of View (FOV) of 90 degrees. An aperture stop (AP) is formed near the center of the core element 52 by grinding away material around the circumference of the core. An alternate method described in the prior art utilizes a two piece core element with material sandwiched between the two pieces forming the aperture stop. Again, the designs can be altered to increase the FOV to 120 degrees or more if required.

The material selected for the core lens element 52 for the MWIR embodiments of FIGS. 3A and 4A can include KRS-5, ZnSe, or one of the Chalcogenide glasses such as IG2, AMTIR-1, GASIR-1. The high index and or high dispersion shells (50, 54, 56) can be Ge, GaAs, Silicon (Si), ZnS, Calcium Fluoride (CaF2), or Spinel. For the design shown in FIG. 3A, the material chosen for the second rear shell element 58 generates conflict with the above rule in order to provide optimal performance. This is because the element is thin and positioned close to the image surface.

Secondary chromatic aberrations and spherochromatism are minimized by selection of the material for each element. The optimization process also involves the complete specification of the lens shell elements located in the front and the back of the core including their sequence and radii of curvature from the common center of the core. In the design of FIG. 3A, the core element 52 is fabricated from material AMTIR-1 and in FIG. 4A the core element 52 is also fabricated from AMTIR-1; however, one of the Chalcogenide glasses such as IG2 or GASIR-1 could also be used for either core element. In FIG. 3A the front shell 50 is made from Ge, the core lens element 52 is made from AMTIR-1, the first rear shell lens element 54 is made from ZnS, and a second rear shell lens element 56 is made from IG2. A first controlled air gap 60 separates the first and second rear shell elements and a second controlled air gap 60 separates the second rear shell from the curved detector focal surface 12. In the design of FIG. 4A, front shell 50 is made from Si, the core 52 is made from AMTIR-1, the first rear shell 54 is made from Ge and the second rear shell 56 is made from CaF2. A first controlled air gap 60 separates the first and second rear shell elements and a second controlled air gap 60 separates the second rear shell element from the curved detector focal surface 12. An anti-reflective or protective coating may be used on the exterior lens element surfaces as needed to improve transmission.

The previous remarks directed to lens contacting and air gaps for the LWIR embodiments of FIGS. 1A and 2A apply to the MWIR embodiments of FIGS. 3A, 4A and 5A. However the bonding method and adhesives as described by Myers et. al. U.S. Pat. No. 6,399,190 are now applicable to the MWIR embodiments of FIGS. 3A, 4A, and 5A.

The air gaps are shown at 60 in FIGS. 3A, 4A and 5A.

The MWIR lens design embodiments provided for the present invention are applicable for an infrared reconnaissance camera having a cooled curved focal surface detector array operating on a small UAV at a low-altitude of approximately 10,000 feet AGL. In this application, the curved focal surface detector can either comprise cooled area detector arrays or a cooled linear detector array operating in TDI mode scanning as described in the prior art. The TDI linear array can provide sufficient signal to noise ratio at desired frame rates due to the fast F# of the lens.

Cryogenic cooling is required for the MWIR detector, and in one embodiment the optical system 10 is placed within the dewar cooler with the curved focal plane detector (FIG. 6). However, the coupling method utilized must be implemented carefully due to the cryogenic temperature cycling involved.

Figure 4B:
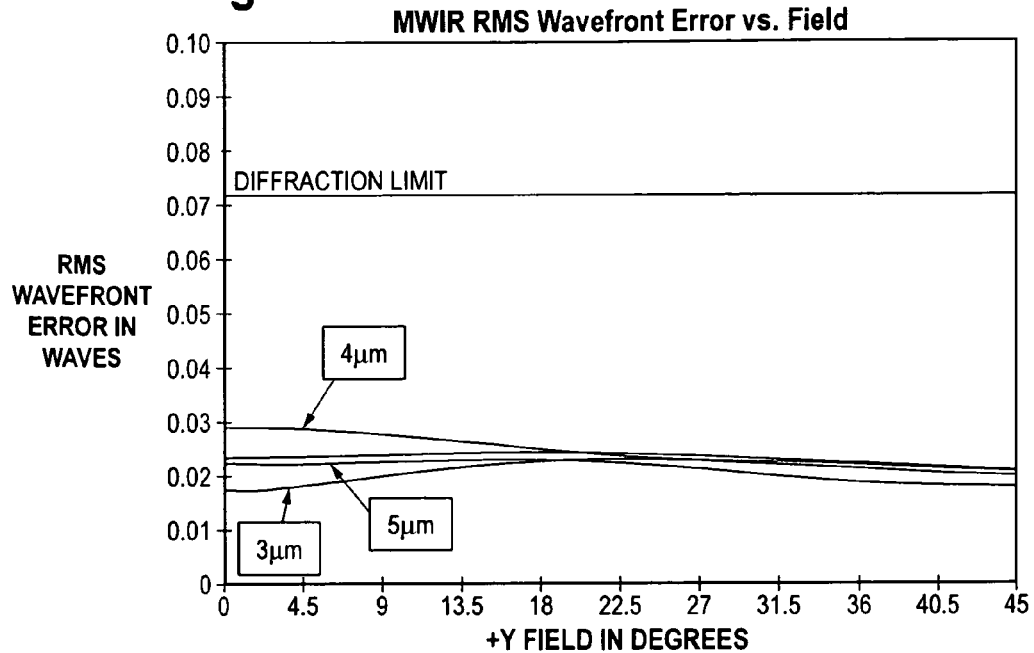
FIG. 4B is a plot of wavefront error vs. field for the embodiment of FIG. 4A.

FIGS. 3B, 4B and 5B illustrate the RMS wavefront error for each lens of FIGS. 3A, 4A and 5A, respectively.

Figure 3C:
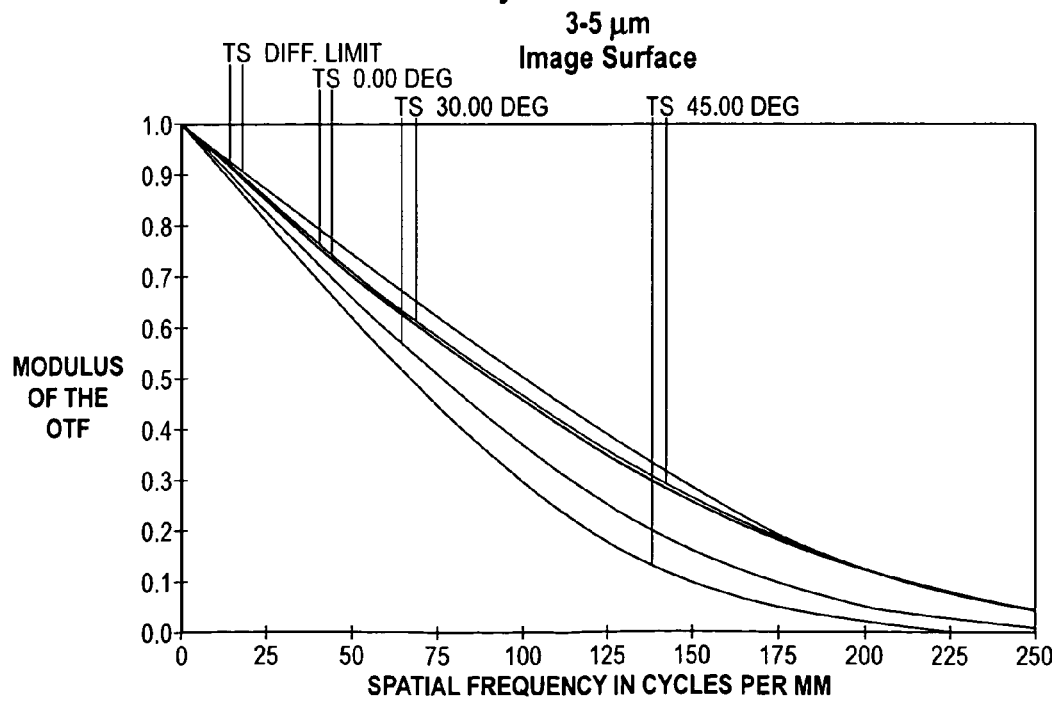
FIG. 3C is a plot of the MWIR polychromatic diffraction modulation transfer function (MTF) for the embodiment of FIG. 3A.
Figure 4C:
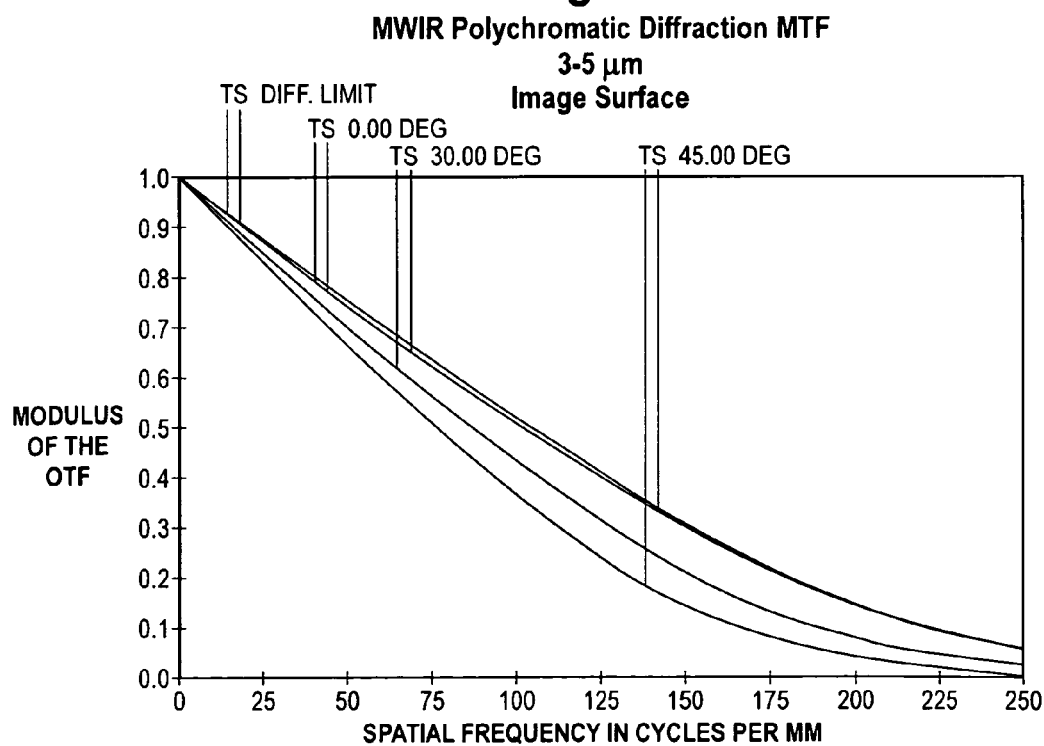
FIG. 4C is a plot of the MWIR polychromatic diffraction modulation transfer function (MTF) for the embodiment of FIG. 4A.

FIGS. 3C, 4C and 5C show the polychromatic diffraction MTF for each lens of FIGS. 3A, 4A and 5A, respectively.

Figures 3D, 3E:
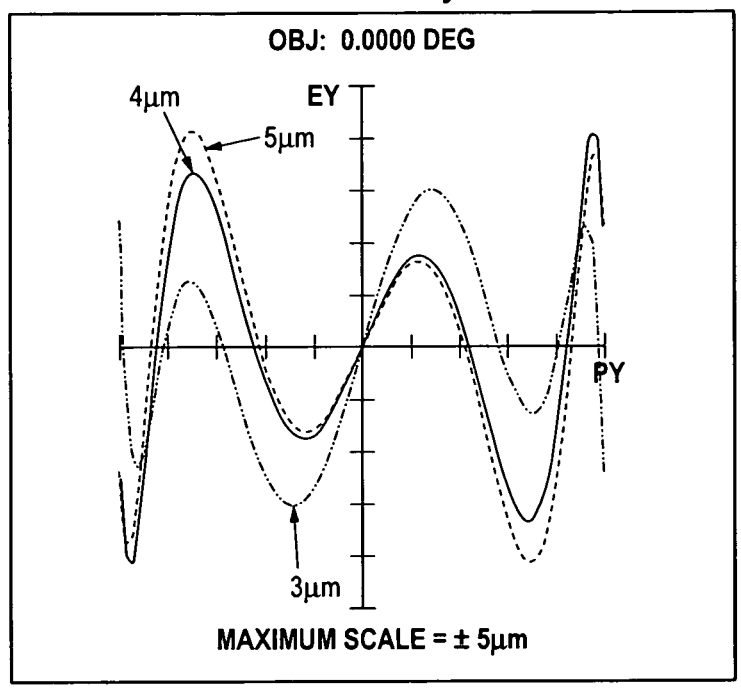
FIG. 3D is a MWIR transverse ray fan plot for the embodiment of FIG. 3A.
FIG. 3E is a lens prescription for the embodiment of FIG. 3A.
Figures 4D, 4E:
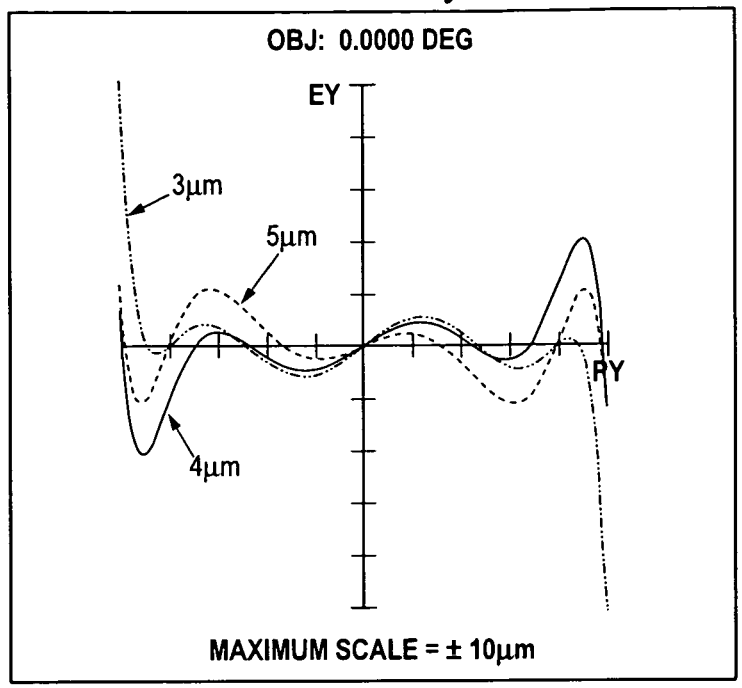
FIG. 4D is a MWIR transverse ray fan plot for the embodiment of FIG. 4A.
FIG. 4E is a lens prescription for the embodiment of FIG. 4A.

FIGS. 3D and 4D depict the transverse ray fan plot for the lenses of FIGS. 3A and 4A, respectively.

FIGS. 3E, 4E and 5D provide the prescription for each lens of FIGS. 3A, 4A and 5A, respectively. The lens prescriptions describe the material composition for each lens element, the element sequence, surfaces, and corresponding radii of curvature. The thickness of each lens element can be determined from the radii of curvatures given in the tables. The designs are optimized for a WFOV MWIR reconnaissance sensor operating at altitudes around 10,000 feet AGL such as on a UAV platform. The WFOV designs minimize the need for stabilization or multi-axis steering of the sensor.

MWIR detector

A curved focal surface detector 14 and monocentric lens 16 is illustrated in FIG. 6. This arrangement is similar to the LWIR embodiment; however, a detector cooling means is required in the MWIR since uncooled bolometers are not available for this spectral waveband. The tiling or mosaic of discrete planar detector arrays 40 is placed at the curved focal surface 12 of the lenses as shown in FIG. 6. Planar detectors 40 are utilized since they are readily available and are less expensive compared to custom curved detectors or a single custom monolithic curved detector array. The preferred embodiment utilizes a tiling or mosaic of cooled detector sub-arrays 40 sensitive in the 3-5 μm MWIR spectral wavelengths. These detectors are typically fabricated from Indium Antimonide (InSb) or Mercury Cadmium Telluride (MCT) or other material sensitive to radiation in the MWIR band and may be linear (e.g., TDI) or area arrays. Several variations of these types of arrays are manufactured by L3 Communications and others. An aspheric field corrector (flattening) optic 42 (FIG. 6A) is used for each detector sub-array. The prescription for the field corrector optic design is not given since it is a simple two surface aspheric field flattening optic as known in art. Alternatively a small relay lens, as taught in the prior art, could be used with each detector array to spread the image and avoid possible gaps in the detected image due to the separate detector arrays.

The corrector optic 42 is placed in front of each detector sub-array 40 and flattens the lens image surface as required since the individual detectors are planar even though placed on a curved surface. In another embodiment, the corrector optic may be implemented as the optical window of each of the detector sub arrays. The lens designs of the present invention could also be utilized with tiled curved detector arrays or a monolithic curved array without the need for a field corrector optic or relay lens. However in the presence of field corrector optics, the lens prescriptions of the present invention may require slight adjustment.

3. SWIR Embodiments

Figure 7A:
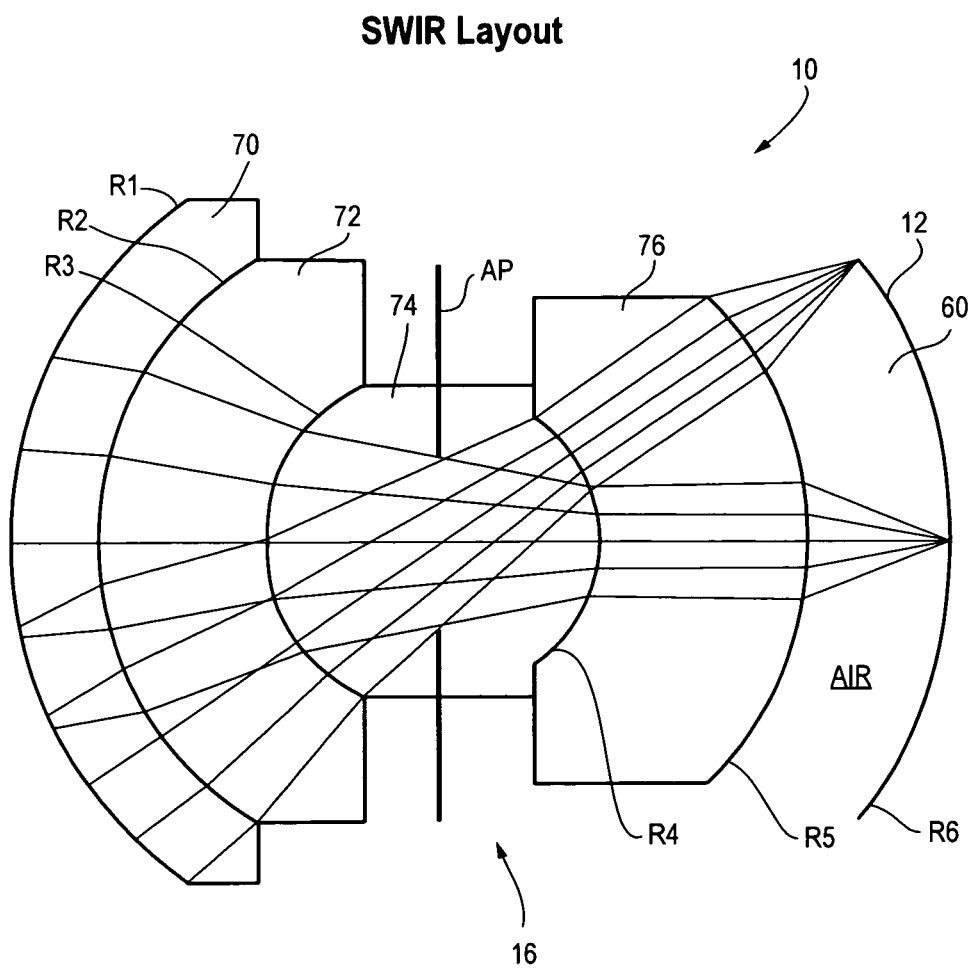
FIG. 7A is an illustration of the layout of a compact SWIR optical system for a reconnaissance camera.

A compact, light-weight, wide field of view optical system 10 for a short wavelength infrared (SWIR) aerial reconnaissance camera is shown in FIG. 7A. The optical system features a curved focal surface 12 and a wide field of view monocentric lens system 16. The monocentric lens system comprises a first front shell lens element 70 and a second front shell lens element 72, a core lens element 74 and a rear shell lens element 76. The first and second front shell lens elements 70 and 72 and the rear shell lens element 76 are concentrically arranged about the center of the core lens element 74 such that infrared radiation entering the monocentric lens passes sequentially through the first and second front shell lens elements 70 and 72, the core lens element 74, and the rear shell lens element 76 and is focused onto the curved focal surface 12.

The first and second front shell lens elements 70 and 72 and the rear shell lens element 76 are made of material having a relatively higher refractive index or a relatively higher optical dispersion, or both in the SWIR band (as compared to the core lens element 74), the material is carefully selected to minimize chromatic aberration and spherical aberration as well as secondary chromatic aberration and spherochromatism, and pass radiation in the SWIR Band. The core lens element 74 is made from a material having a relatively lower refractive index or a relatively lower optical dispersion, or both in the SWIR band (as compared to the lens elements 70, 72 and 76) and carefully selected to compensate for spherical and chromatic aberration as well as secondary chromatic aberration and spherochromatism.

Figure 7B:
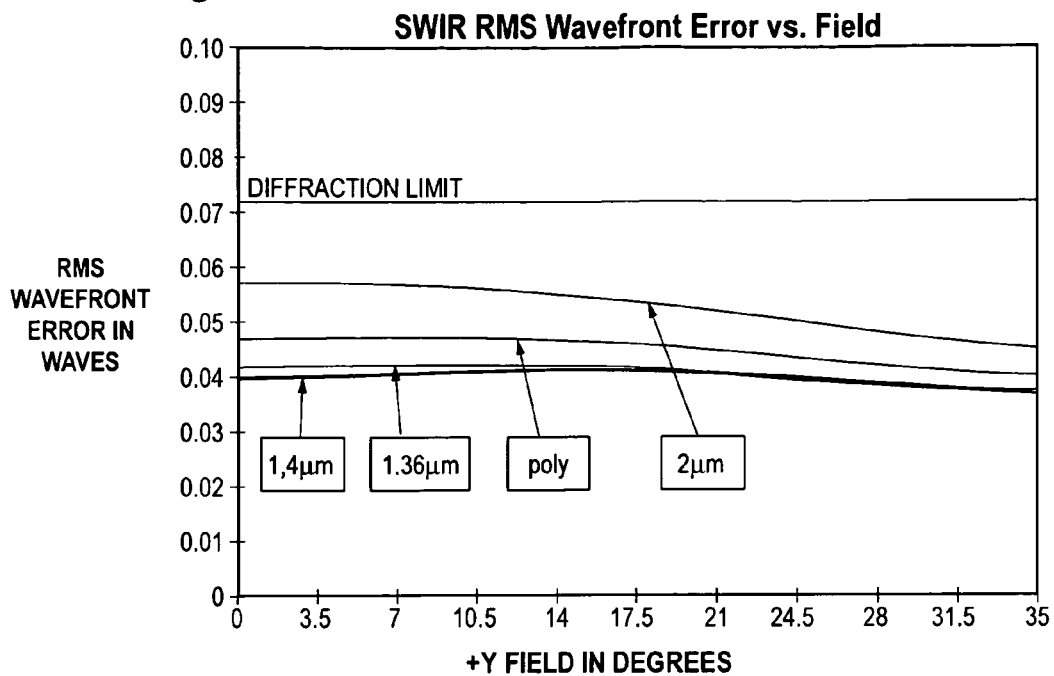
FIG. 7B is a plot of wavefront error vs. field for the embodiment of FIG. 7A.
Figure 7C:
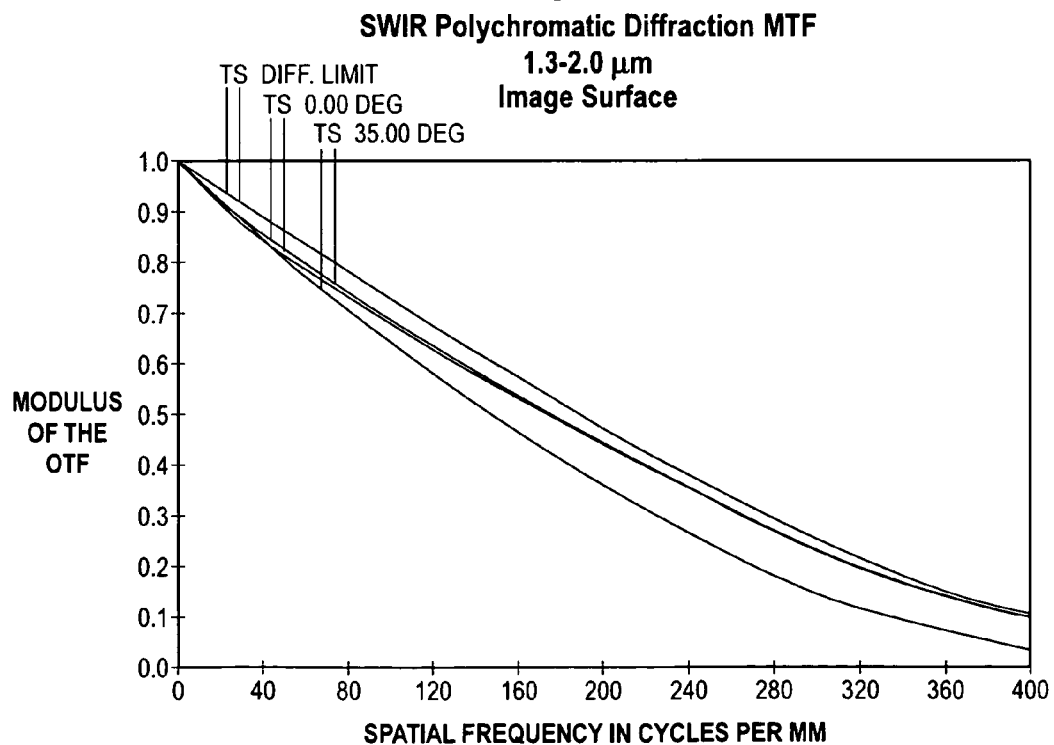
FIG. 7C is a plot of the SWIR polychromatic diffraction modulation transfer function (MTF) for the embodiment of FIG. 7A.

The design solutions for the SWIR embodiment of FIG. 7A are more numerous as compared to the LWIR or MWIR designs described herein due to the availability of more types of materials applicable to the SWIR spectral band. FIG. 7A illustrates a monocentric SWIR lens design for 1.3-2.0 μm wavelengths having a focal length of around 2 inches, F # of near unity, and a total FOV of 70 degrees. FIG. 7A illustrates the layout for the lens; FIG. 7B illustrates the RMS wavefront error for the lens; FIG. 7C shows the polychromatic diffraction MTF for the lens; and FIG. 7D gives the prescription for the lens.

The remarks above regarding a curved focal plane detector for the LWIR and MWIR embodiments also apply to the SWIR embodiment. Preferred embodiments include a curved focal surface detector array (FIG. 6) placed at the curved focal surface 12. The curved focal surface detector array can optionally take the form of a mosaic of discrete planar detector arrays placed about the curved focal surface as shown in FIG. 6 and described previously. A corrector optic is placed in front of each of the planar detector arrays in the mosaic. The detector array can be either two dimensional or linear (e.g., TDI).

The monocentric lens elements which are in contact can be joined using conventional optical bonding materials such as Norland UV cured optical adhesive since the materials have good transparency in the SWIR spectral band. Also, since cryogenic cooling is generally not required for the SWIR detector arrays which are typically fabricated from Indium Gallium Arsenide (InGaAs), the coupling method used for the contacted lens elements does not need to withstand cryogenic temperature cycling.

In the embodiment of FIG. 7A, the first front shell element 70 is made from N-KZFS2, the second front shell lens element 72 is made from Si, the rear shell lens element 76 is made from Si, and the core lens element 74 is fabricated from ZnS. The design further features an aperture stop AP located near the center of core lens element.

4. UAV Embodiment

FIG. 8A is an illustration of an unmanned aerial vehicle (UAV) 100 that is used for reconnaissance and surveillance. The UAV 100 is conventional and includes an air frame, power plant, navigation and communication electronics, etc. as is known in the art. The UAV 100 includes an IR reconnaissance camera system 106 that incorporates one of the optical systems as disclosed herein, such as a LWIR, MWIR or SWIR optical system shown in the drawings. The reconnaissance camera 106 is shown in greater detail in FIG. 8B and includes an optical window 102 which is preferably constructed of a material that is transparent to the band of interest, the optical system 10, monocentric lens 16, and curved focal plane detector 104 located at the curved focal surface of the lens 16. The camera system generates image data which is output in real time to memory and then downlinked from the UAV 100 to a ground station (not shown) for analysis in known manner.

5. Definitions

In this document, the following terms are defined as follows:

1) Chalcogenide Glass

The term "chalcogenide glass" refers to a glass containing one or more chalcogenide elements. These are Group 16 elements in the periodic table, e.g. sulfur, selenium or tellurium. Such glasses are covalently bonded materials and may be classified as network solids. In effect, the entire glass matrix acts like an infinitely bonded molecule. The classical chalcogenide glasses are strong glass-formers (mainly sulphur based ones) such as systems As—S, Ge—S possess glasses within large concentration regions. Glass forming abilities decrease with increasing molar weight of constituent elements i.e. S>Se>Te.

AMTIR-1

The term AMTIR-1 refers to a chalcogenide glass with a lower dispersion; the amorphous glass contains arsenic and is chemically identified as $Ge_{33} As_{12} Se_{55}$. The glass has good transmission properties in the infrared spectral bands, 0.75-14 µm with a refractive index of around 2.5. AMTIR-1 is a registered trademark of Amorphous Materials. (See IG2 below)

GASIR-1

The term GASIR-1 refers to a chalcogenide glass with a higher dispersion, the glass contains arsenic and is chemically identified as $Ge_{22} As_{20} Se_{58}$. The glass has good transmission properties in the infrared spectral bands, 0.8-14 µm with a refractive index of around 2.5

IG2

The term IG2 refers to a chalcogenide glass with a lower dispersion; the glass contains arsenic and is chemically identified as $Ge_{33} As_{12} Se_{55}$. The glass has good transmission properties in the infrared spectral bands, 0.75-14 µm with a refractive index of around 2.5. The glass is recognized as an equivalent to AMTIR-1.

2) Other Glasses/Materials

KRS-5

The term KRS-5 refers to a Thallium Bromoiodide material which has a low dispersion and good transmission properties in the infrared spectral bands, 0.6-32 µm, with a refractive index of around 2.4.

N-KZFS2

The term N-KSFS2 refers to an ecologically friendly glass that has no lead content and is not refined with Arsenic. This is a high dispersion glass referred to as a short flint special developed for apochromatic systems. An apochromatic lens system typically has chromatic aberration corrected throughout the visible spectrum. An apochromatic system requires high dispersion glasses that deviate from the normal dispersion behavior. This glass provides transmission in the SWIR band, greater than 97% transmission at 1.5 µM. Reference: "Ecologically Friendly Optical Glasses," Joseph Hayden, Optics and Photonics News, August 2004, and Schott Inc. North America catalogue.

While presently preferred embodiments have been described with particularity, persons skilled in the art will appreciate that variation from the specifics of the disclosed embodiments can be made without departure from the scope of the invention. All questions concerning scope are to be answered by reference to the appended claims.

We claim:

1. A wide field of view optical system for a long wavelength infrared (LWIR) aerial reconnaissance camera, comprising:
a curved focal surface;
a wide field of view monocentric lens system, the monocentric lens system comprising:
    a first front shell lens element and a second front shell lens element;
    a core lens element; and
        a rear shell lens element separated from the curved focal surface by an air gap;
    wherein the first and second front shell lens elements and the rear shell lens elements are concentrically arranged about the core lens element center such that infrared radiation entering the monocentric lens passes sequentially through the first and second front shell lens element, the core lens element, the rear shell lens element and the air gap to be focused onto the curved focal surface;
    wherein the first and second front shell lens elements and the rear shell lens elements are made of material having a relatively higher refractive index or a relatively higher optical dispersion, or both, in the LWIR band, the material selected to minimize chromatic and spherical aberration as well as secondary chromatic aberration and spherochromatism, and pass radiation in the LWIR Band; and
    wherein the core lens element is made from a material having a relatively lower refractive index or a relatively lower optical dispersion, or both, in the LWIR band, and is selected to compensate for spherical and chromatic aberration as well as secondary chromatic aberration and spherochromatism;
    wherein the first front shell element is made from ZnSe, the second front shell lens element is made from GaAs, the rear shell lens element is made from GaAs, and the core lens element is made from KRS-5.

2. The optical system of claim 1, wherein the first and second front shell lens elements and the rear shell lens element are made of material selected from the group of materials consisting of germanium (Ge), gallium arsenide (GaAs), zinc sulfide (ZnS), and zinc selenide (ZnSe).

3. The optical system of claim 1, wherein the core lens element is made from a material selected from the group of materials consisting of thallium bromoiodide and a chalcogenide glass.

4. The optical system of claim 1, further comprising a curved focal surface detector array.

5. The optical system of claim 4, wherein the curved focal surface detector array is uncooled.

6. The optical system of claim 4, wherein the curved focal surface detector array comprises a mosaic of discrete detector arrays placed about the curved focal surface.

7. The optical system of claim 6, wherein the discrete detector arrays are planar and the system further comprises a corrector optic placed in front of each of the planar detector arrays in the mosaic.

8. The optical system of claim 7, wherein the corrector optic comprises an optical window for each of the planar detector arrays in the mosaic.

9. The optical system of claim 6, wherein the detector arrays each comprise a two dimensional area array.

10. An aerial reconnaissance vehicle, comprising
an aircraft; and
an infrared reconnaissance camera system installed in the aircraft,
wherein the camera system includes an optical system as recited in claim 1.

* * * * *